(12) United States Patent
Kim et al.

(10) Patent No.: US 12,453,097 B2
(45) Date of Patent: Oct. 21, 2025

(54) SEMICONDUCTOR DEVICE AND MEMORY DEVICE INCLUDING A DUMMY ELEMENT

(71) Applicant: SAMSUNG ELECTRONICS CO., LTD., Suwon-si (KR)

(72) Inventors: Changbum Kim, Seoul (KR); Sunghoon Kim, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 581 days.

(21) Appl. No.: 17/453,228

(22) Filed: Nov. 2, 2021

(65) Prior Publication Data

US 2022/0320131 A1 Oct. 6, 2022

(30) Foreign Application Priority Data

Apr. 6, 2021 (KR) .................. 10-2021-0044702

(51) Int. Cl.
*H10B 43/50* (2023.01)
*G11C 16/04* (2006.01)
(Continued)

(52) U.S. Cl.
CPC ......... *H10B 43/50* (2023.02); *G11C 16/0483* (2013.01); *G11C 16/24* (2013.01);
(Continued)

(58) Field of Classification Search
CPC ........ H10B 43/50; H10B 43/40; H10B 43/27; H10B 41/50; H10B 41/41; G11C 16/0483; G11C 16/24
(Continued)

(56) References Cited

U.S. PATENT DOCUMENTS 6,020,616 A * 2/2000 Bothra ............. H01L 21/76229
257/532
7,205,617 B2 4/2007 Ohta et al.
(Continued)

FOREIGN PATENT DOCUMENTS

KR 10-2009-0071045 A 7/2009
KR 10-2021-0027938 A 3/2021

OTHER PUBLICATIONS

Partial European Search Report Dated Jul. 14, 2022, For Application Serial No. EP 22152445.7.
(Continued)

*Primary Examiner* — Eric W Jones
(74) *Attorney, Agent, or Firm* — Morgan, Lewis & Bockius LLP

(57) ABSTRACT

A semiconductor device includes a plurality of semiconductor elements, each of the plurality of semiconductor elements including an active region disposed on a substrate, and a gate structure intersecting the active region and extending in a first direction that is parallel to an upper surface of the substrate; and at least one dummy element disposed between a pair of semiconductor elements adjacent to each other in a second direction, intersecting the first direction, among the plurality of semiconductor elements. The dummy element includes a dummy active region and at least one dummy gate structure intersecting the dummy active region and extending in the first direction. A length of the dummy active region in the second direction is less than a length of the active region included in each of the pair of semiconductor elements.

13 Claims, 19 Drawing Sheets

(51) Int. Cl.
    *G11C 16/24*    (2006.01)
    *H10B 41/27*    (2023.01)
    *H10B 41/41*    (2023.01)
    *H10B 41/50*    (2023.01)
    *H10B 43/27*    (2023.01)
    *H10B 43/40*    (2023.01)

(52) U.S. Cl.
    CPC ............ *H10B 41/27* (2023.02); *H10B 41/41* (2023.02); *H10B 41/50* (2023.02); *H10B 43/27* (2023.02); *H10B 43/40* (2023.02)

(58) Field of Classification Search
    USPC ........................................... 257/314
    See application file for complete search history.

(56) References Cited

U.S. PATENT DOCUMENTS

| | | | |
|---|---|---|---|
| 9,136,268 | B2 | 9/2015 | Oh et al. |
| 10,490,543 | B2 | 11/2019 | Chen et al. |
| 10,651,054 | B2 | 5/2020 | Or-Bach et al. |
| 10,777,288 | B2* | 9/2020 | Kurjanowicz ...... H01L 23/5252 |
| 2003/0127697 | A1* | 7/2003 | Ohta ............... H01L 21/823412 |
| | | | 257/E27.06 |
| 2007/0221957 | A1* | 9/2007 | Kitajima ............... H01L 27/092 |
| | | | 257/202 |
| 2011/0018090 | A1* | 1/2011 | Yamaguchi ......... H01L 27/0207 |
| | | | 257/401 |
| 2012/0292712 | A1* | 11/2012 | Baek ..................... H01L 27/088 |
| | | | 257/E27.06 |
| 2014/0106538 | A1* | 4/2014 | Wang ................... H01L 21/324 |
| | | | 438/424 |
| 2019/0089067 | A1 | 3/2019 | Zihir et al. |
| 2019/0097013 | A1* | 3/2019 | Chen .................. H01L 29/0603 |
| 2019/0371783 | A1 | 12/2019 | Lo et al. |
| 2020/0051653 | A1* | 2/2020 | Kurjanowicz ......... H10B 20/25 |
| 2020/0105616 | A1 | 4/2020 | Liaw |
| 2020/0126978 | A1 | 4/2020 | Wang et al. |
| 2020/0357786 | A1 | 11/2020 | Sio et al. |
| 2021/0066313 | A1 | 3/2021 | Park et al. |

OTHER PUBLICATIONS

Office Action dated Apr. 17, 2025 issued in corresponding Korean Patent Application No. 10-2021-0044702. (Note: US 2007/0221957 A1 already submitted.).

* cited by examiner

SEMICONDUCTOR DEVICE AND MEMORY DEVICE INCLUDING A DUMMY ELEMENT

CROSS-REFERENCE TO RELATED APPLICATION(S)

This application claims benefit of and priority to Korean Patent Application No. 10-2021-0044702, filed on Apr. 6, 2021 in the Korean Intellectual Property Office, the disclosure of which is herein incorporated by reference in its entirety.

TECHNICAL FIELD

The present inventive concept relates to a semiconductor device and a memory device and, more particularly, to a semiconductor device and a memory device that include a dummy element.

DISCUSSION OF THE RELATED ART

A semiconductor device may include a plurality of semiconductor elements operating at various power voltages, and the plurality of semiconductor elements may be disposed in a plurality of regions defined according to levels of power voltages required for operation. When the plurality of semiconductor elements are arranged on a substrate for manufacturing the semiconductor device, an extra space may be generated between the plurality of semiconductor elements. A dummy element may be disposed in a space between the plurality of semiconductor elements, in consideration of a design rule and/or for defining an interval between gate structures included in the plurality of semiconductor elements.

SUMMARY

A semiconductor device includes a plurality of semiconductor elements, each of the plurality of semiconductor elements including an active region disposed on a substrate, and a gate structure intersecting the active region and extending in a first direction that is parallel to an upper surface of the substrate; and at least one dummy element disposed between a pair of semiconductor elements adjacent to each other in a second direction, intersecting the first direction, among the plurality of semiconductor elements, wherein the dummy element includes a dummy active region and at least one dummy gate structure intersecting the dummy active region and extending in the first direction, wherein a length of the dummy active region in the second direction is less than a length of the active region included in each of the pair of semiconductor elements.

A memory device includes a cell region including gate electrode layers and insulating layers, stacked on a substrate, and channel structures extending in a direction that is perpendicular to an upper surface of the substrate, passing through the gate electrode layers and the insulating layers, and connected to the substrate; and a peripheral circuit region including page buffers connected to the channel structures through bit lines, and a data input/output circuit connected between the page buffers and input/output pads, wherein the data input/output circuit includes a plurality of semiconductor elements, each including an active region and a gate structure intersecting the active region and extending in a first direction, and at least one dummy element disposed between a pair of semiconductor elements adjacent to each other in a second direction, intersecting the first direction, among the plurality of semiconductor elements, and having a dummy active region and a dummy gate structure intersecting the dummy active region and extending in the first direction, wherein an area of the dummy active region is smaller than an area of the active region included in each of the pair of semiconductor elements.

A semiconductor device includes a substrate having a standard cell region in which standard cells are disposed, a filler cell region in which filler cells are disposed, and a dummy region different from the standard cell region and the filler cell region; a plurality of semiconductor elements, each of the plurality of semiconductor elements including an active region and a gate structure intersecting the active region and extending in a first direction that is parallel to an upper surface of the substrate, and disposed in the standard cell region; and a plurality of dummy elements, each of the plurality of dummy elements including a dummy active region and at least one dummy gate structure intersecting the dummy active region and extending in the first direction, and disposed in the filler cell region and the dummy region, wherein the plurality of dummy elements includes at least one first dummy element disposed in the dummy region and at least one second dummy element disposed in the filler cell region, wherein a length of the dummy active region in a second direction, intersecting the first direction and parallel to the upper surface of the substrate, included in the first dummy element is smaller than a length of the dummy active region included in the second dummy element.

BRIEF DESCRIPTION OF DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION

Hereinafter, embodiments of the present inventive concept will be described with reference to the accompanying drawings.

Figure 1:
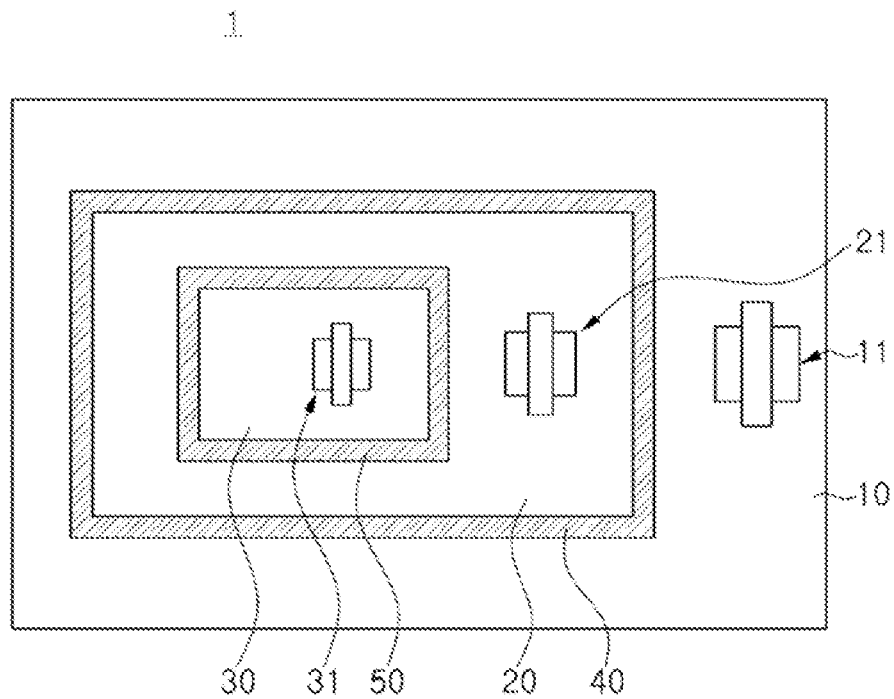
FIG. 1 is a schematic diagram illustrating a semiconductor device according to an embodiment of the present inventive concept.

FIG. 1 is a schematic diagram illustrating a semiconductor device according to an embodiment of the present inventive concept.

Referring to FIG. 1, a semiconductor device 1, according to an embodiment of the present inventive concept, may include a plurality of voltage regions 10, 20, and 30 to which different power voltages are supplied. For example, the semiconductor device 1 may include a first voltage region 10, a second voltage region 20, and a third voltage region 30. This is illustrative, and types of voltage regions 10, 20, and 30 included in the semiconductor device 1 may be different from those of the arrangement illustrated in FIG. 1. For example, the semiconductor device 1 may include only two voltage regions, or may include four or more voltage regions.

In the arrangement illustrated in FIG. 1, the first voltage region 10 may receive a first power voltage, the second voltage region 20 may receive a second power voltage, and the third voltage region 30 may receive a third power voltage. For example, the first power voltage may be greater than the second power voltage, and the second power voltage may be greater than the third power voltage. According to embodiments, a relationship of the voltages of first to third power voltages may be variously changed.

Each of the plurality of voltage regions 10, 20, and 30 may include at least one semiconductor element. A semiconductor element 11 included in the first voltage region 10 may operate with the first power voltage, and a semiconductor element 21 included in the second voltage region 20 may operate with the second power voltage. Similarly, a semiconductor element 31 included in the third voltage region 30 may operate with the third power voltage.

Since each of the semiconductor elements 11, 21, and 31 operates by different power voltages, the semiconductor elements 11, 21, and 31 may have different structures. For example, each of the semiconductor elements 11, 21, and 31 may include an active region formed on a substrate and including a source region and a drain region, and a gate structure intersecting the active region. The gate structure may include a gate conductive layer and a gate insulating layer, and the gate insulating layer may have different thicknesses in each of the semiconductor elements 11, 21, and 31.

For example, when the second power voltage is less than the first power voltage, a thickness of the gate insulating layer included in the semiconductor element 21 of the second voltage region 20 may be the same as a thickness of the gate insulating layer included in the semiconductor element 11 of the first voltage region 10. In addition, when the second power voltage is less than the first power voltage, a channel length of the semiconductor element 21 of the second voltage region 20 may be less than a channel length of the semiconductor element 11 of the first voltage region 10.

Figure 2:
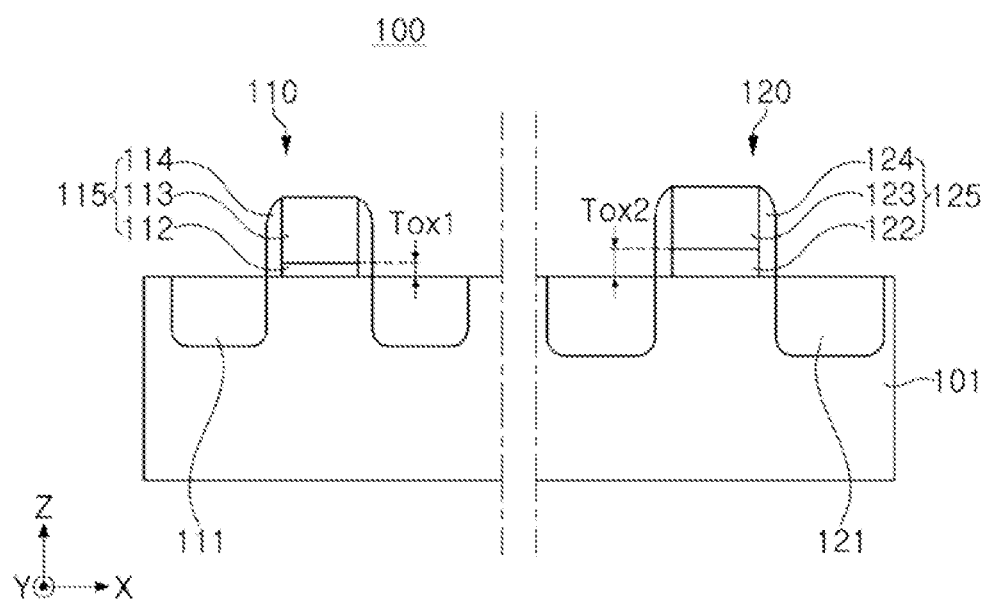
FIG. 2 is a schematic diagram illustrating semiconductor elements included in a semiconductor device according to an embodiment of the present inventive concept.

FIG. 2 is a view schematically illustrating semiconductor elements included in a semiconductor device according to an embodiment of the present inventive concept.

Referring to FIG. 2, a semiconductor device 100, according to an embodiment of the present inventive concept, may include a first semiconductor element 110 and a second semiconductor element 120. In the arrangement illustrated in FIG. 2, both the first semiconductor element 110 and the second semiconductor element 120 may be transistors, and may be formed on a substrate 101 including a semiconductor material.

The first semiconductor element 110 may include an active region 111 including a source region and a drain region, and a gate structure 115 extending in a first direction (e.g., a Y-axis direction). The gate structure 115 may include a gate insulating layer 112, a gate conductive layer 113, and a gate spacer 114. A structure of the second semiconductor element 120 may be similar to a structure of the first semiconductor element 110.

For example, a power voltage supplied to the first semiconductor element 110 may be lower than a power voltage supplied to the second semiconductor element 120. Due to a difference in power voltage, a thickness $T_{OX1}$ of the gate insulating layer 112 of the first semiconductor element 110 may be less than a thickness $T_{OX2}$ of a gate insulating layer 122 of the second semiconductor element 120. For example, the thickness $T_{OX1}$ of the gate insulating layer 112 in the first semiconductor element 110 may be 70 Å or less, and the thickness $T_{OX2}$ of the gate insulating layer 122 in the second semiconductor element 120 may be 50 to 150 Å. Also, a channel length of the first semiconductor element 110 may be less than a channel length $L_{CH2}$ of the second semiconductor element 120.

Since the channel length of the first semiconductor element 110 and the channel length of the second semiconductor element 120 are different from each other, a design rule of a first voltage region in which the first semiconductor element 110 is disposed may be different from a design rule of a second voltage region in which the second semiconductor element 120 is disposed. For example, an interval to be secured between adjacent gate structures 115 in the first voltage region may be different from an interval to be secured between adjacent gate structures 115 in the second voltage region, in a second direction (e.g., an X-axis direction).

For example, in the second voltage region having the relatively large channel length, a dummy element may be disposed to be adjacent to the second semiconductor element 120, and the dummy element in the second voltage region may include a dummy active region and a dummy gate structure, similarly to the second semiconductor element 120. In some embodiments, the dummy active region formed in the second voltage region may have an area equal to or larger than an area of an active region 121 of the second semiconductor element 120.

In the first voltage region having the relatively small channel length, no sufficient space to form the same dummy active region as the active region 111 of the first semiconductor element 110 may be formed. In an embodiment of the present inventive concept, at least one dummy element may be disposed in the first voltage region to be adjacent to the first semiconductor element 110 in the second direction, and a dummy active region of the dummy element may have a length that is less than a length of the active region 111 of the first semiconductor element 110 in the second direction.

A dummy element disposed in the first voltage region may include a dummy active region and a dummy gate structure, and the dummy active region may have a length that is less than a length of the active region 111 of the first semiconductor element 110 in the second direction. Therefore, a deviation in an interval between the gate structures 115 and a deviation in interval between the active region 111, in the first voltage region in the second direction, may be made uniform, yield may be increased and electrical characteristics of the semiconductor device 100 may be made more desirable. For example, an element isolation layer may be regularly formed by equalizing the deviation in interval between the active regions 111, thereby making characteristics more desirable and increasing yield.

Figure 3A:
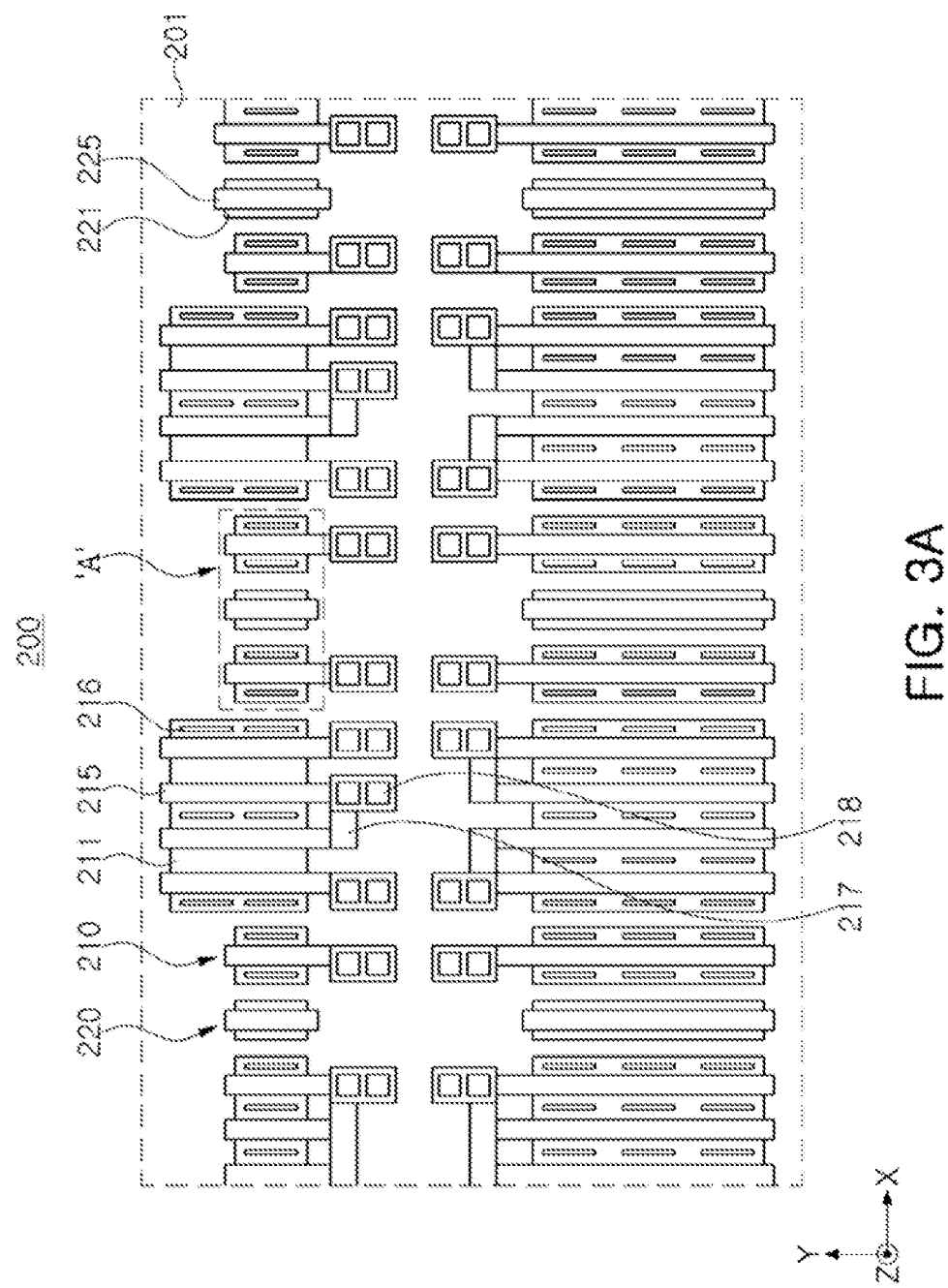
FIGS. 3A and 3B are plan views illustrating a semiconductor device according to an embodiment of the present inventive concept.
Figure 3B:
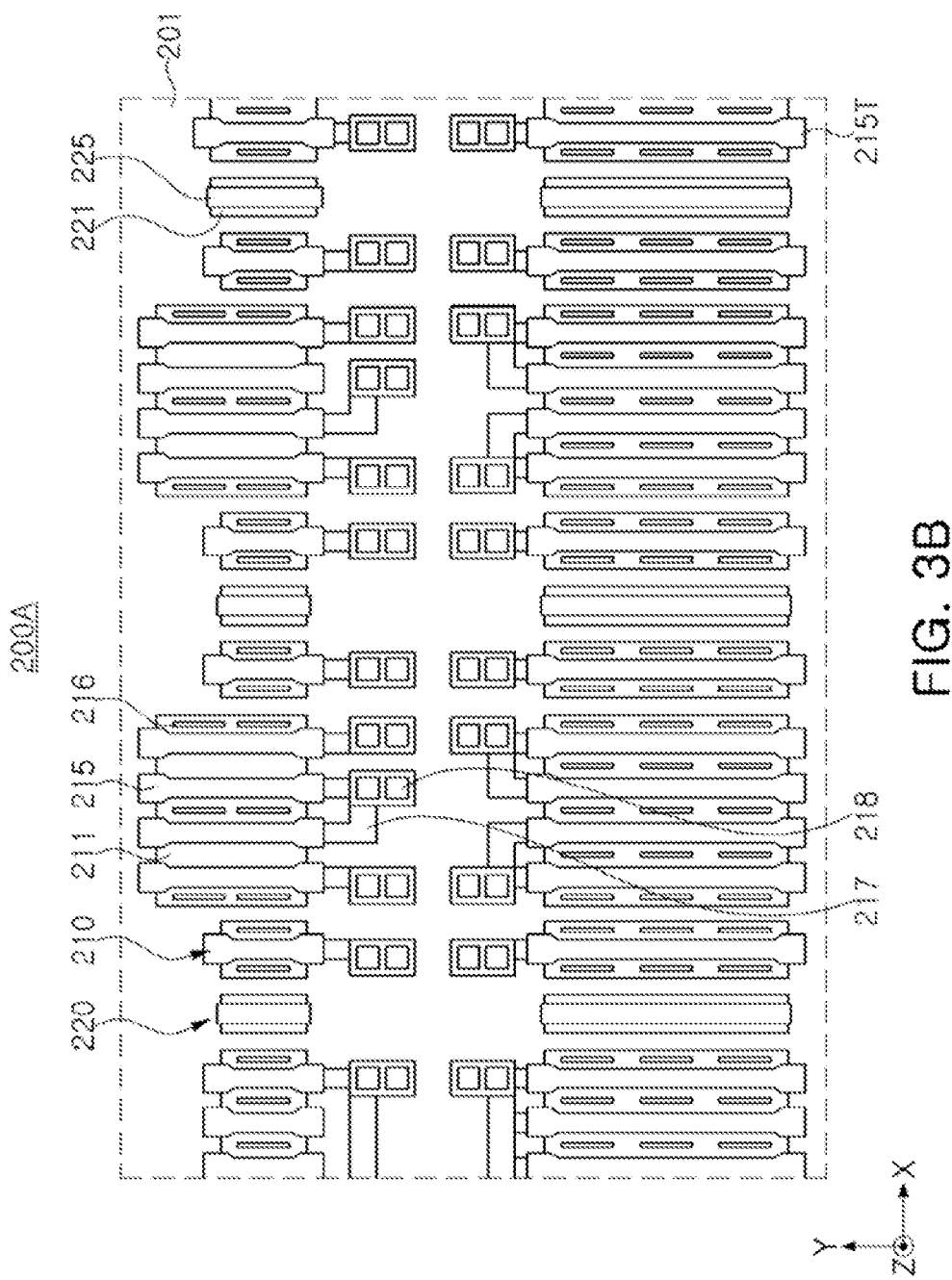

FIGS. 3A and 3B are plan views illustrating a semiconductor device according to an embodiment of the present inventive concept.

First, referring to FIG. 3A, a semiconductor device, 200 according to an embodiment of the present inventive concept, may include a plurality of semiconductor elements 210 and at least one dummy element 220. The semiconductor elements 210 and the dummy element 220 may be formed on a substrate 201.

Each of the semiconductor elements 210 may include an active region 211 disposed on the substrate 201, and a gate structure 215 intersecting the active region 211 and extending in the first direction (e.g., the Y-axis direction), parallel to an upper surface of the substrate 201. At least one active contact may be connected to the active region 211, and the active contact may be connected to at least one of wiring patterns disposed on the semiconductor elements 210 in the third direction (e.g., the Z-axis direction), perpendicular to the upper surface of the substrate 201. The gate structure 215 may be connected to lower wirings 217 and gate contacts 218. Shapes and arrangement of the lower wirings 217 and the gate contacts 218 are not necessarily limited as illustrated in FIG. 3A, and may be variously changed.

Among the semiconductor elements 210, the dummy element 220 may be disposed between a pair of semiconductor elements adjacent to each other in the second direction (e.g., the X-axis direction), intersecting the first direction (e.g., the Y-axis direction) and parallel to the upper surface of the substrate 201. The dummy element 220 may include a dummy active region 221 and a dummy gate structure 225 intersecting the dummy active region 221 and extending in the first direction.

For example, the semiconductor elements 210 may be low voltage elements operating at a relatively low power voltage, for example, a power voltage of about 1V, in the semiconductor device 200. As described above with reference to FIG. 1, the semiconductor elements 210 operating at a low power voltage may have a relatively small size, compared to other elements operating at a relatively high power voltage.

In processes of designing and manufacturing the semiconductor device 200 with the semiconductor elements 210 operating at a low power voltage, insufficient space for disposing a further semiconductor element 210 between adjacent semiconductor elements 210 may occur. Only the dummy gate structure 225 might be disposed in a corresponding space, to reduce a deviation in interval between the gate structures 215 and increase yield of the process. In this case, an interval between the active regions 211 included in the semiconductor elements 210 may increase to expand an area of at least one of the active regions 211, and characteristics of the semiconductor elements 210 may be thus changed.

In an embodiment of the present inventive concept, the above problem may be solved by disposing a dummy element 220 including the dummy gate structure 225 and the dummy active region 221. Since the dummy element 220 may include the dummy active region 221, expansion of the active regions 211 of the adjacent semiconductor elements 210 may be prevented. Therefore, the semiconductor elements 210 may have electrical characteristics designed as intended.

Referring to FIG. 3A, the semiconductor elements 210 disposed on opposite sides of the dummy element 220 may have different areas. In this case, a length of the dummy active region 221 in the first direction may correspond to a length of a longer active region 211 among the active regions 211 of a pair of adjacent semiconductor elements 210.

In the arrangement illustrated in FIG. 3A, the gate structure 215 and the dummy gate structure 225 may have the same length in the second direction. However, a length of the dummy gate structure 225 may be different from a length of the gate structure 215, in the second direction.

In the arrangement described with reference to FIG. 3A, the dummy element 220 is illustrated as being disposed between the pair of semiconductor elements 210 in the second direction, but an arrangement of the dummy element 220 may be changed. For example, the dummy element 220 may be disposed between the semiconductor elements 210 and a guard pattern surrounding the semiconductor elements 210, rather than between the semiconductor elements 210. In this case, the dummy element 220 may be adjacent to one of the semiconductor elements 210 only on one side, in the second direction.

Next, referring to FIG. 3B, a gate structure 215 of a semiconductor device 200A may include a gate tap region 215T. At least a portion of the gate tab region 215T may overlap an active region 211, and may have a relatively wide width, compared to other regions of the gate structure 215, in the second direction. By forming the gate tab region 215T, a length of a channel region may be effectively secured, and physical deformation, for example, collapse of the gate structure 215, may be prevented.

In the arrangement illustrated in FIG. 3B, only the gate structure 215 is illustrated as including the gate tap region 215T, but according to embodiments, a dummy gate structure 225 may also include a gate tap region having a relatively wide width. Referring to FIG. 3B, a boundary of the active region 211 extending in the second direction may be formed on opposite sides of the gate tab region 215T. According to embodiments, a relative position between the boundary of the active region 211 and the gate tab region 215T may be variously changed.

Hereinafter, the semiconductor elements 210 and the dummy element 220 will be described in detail with reference to FIGS. 4A and 4B.

Figure 4A:
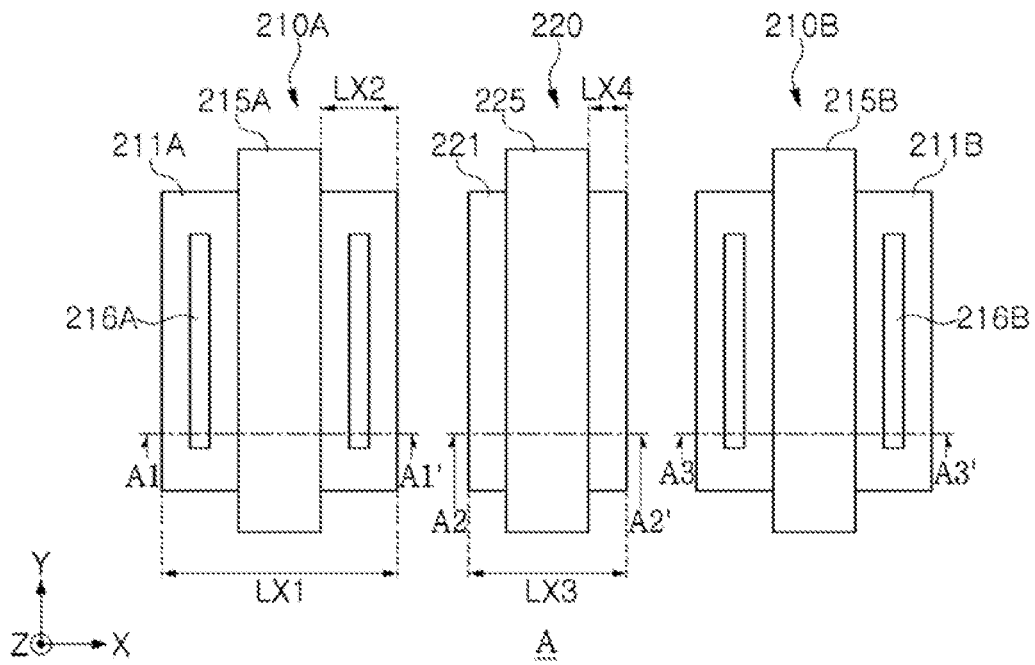
FIGS. 4A and 4B are enlarged views illustrating portion 'A' of FIG. 3A.
Figure 4B:
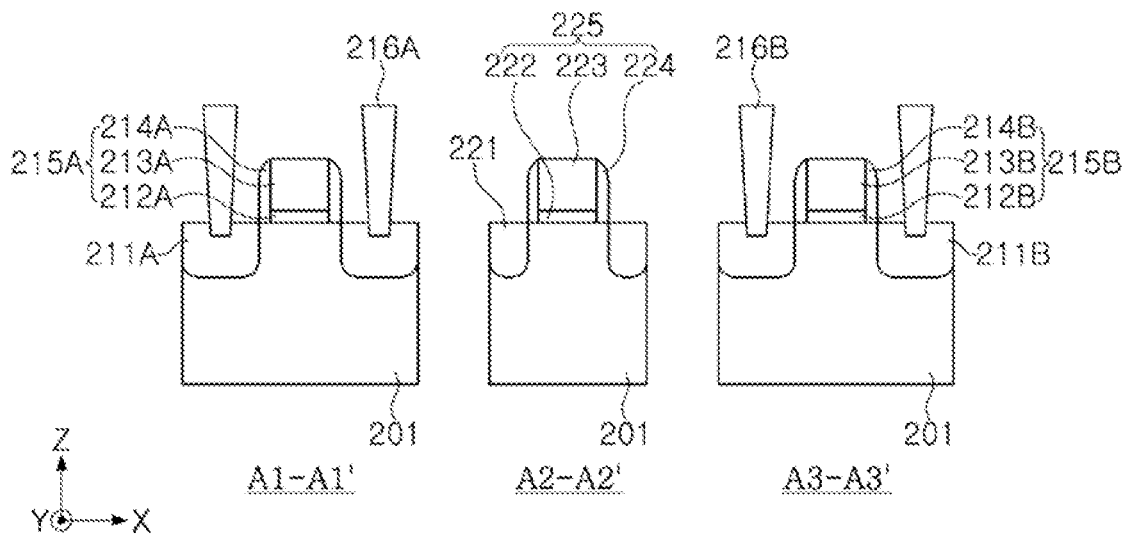

FIGS. 4A and 4B are enlarged views illustrating portion 'A' of FIG. 3A.

FIG. 4A is an enlarged plan view illustrating portion 'A' of FIG. 3A, and FIG. 4B is a cross-sectional view illustrating cross-sections in directions A1-A1 A2-A2', and A3-A3' of FIG. 4A. Referring to FIGS. 4A and 4B, a dummy element 220 may be disposed between a pair of semiconductor elements 210A and 210B. The pair of semiconductor elements 210A and 210B may include a first semiconductor element 210A and a second semiconductor element 210B having structures similar to each other.

The first semiconductor element 210A may include a first active region 211A, a first gate structure 215A extending in the first direction (e.g., the Y-axis direction), a first active contact 216A, and the like. The first active region 211A may provide a source region and a drain region on opposite sides of the first gate structure 215A. The first semiconductor element 210A may have a first length LX1 in the second direction, and each of the source region and the drain region may have a second length LX2 on opposite sides of the first gate structure 215A.

The dummy element 220 may include a dummy active region 221 and a dummy gate structure 225, and the dummy gate structure 225 may extend in the first direction, similarly to the first gate structure 215A. The dummy active region 221 may include a dummy source region and a dummy drain region, disposed on opposite sides of the dummy gate structure 225. The dummy element 220 may have a third length LX3 in the second direction, and each of the dummy source region and the dummy drain region may have a fourth length LX4 on opposite sides of the dummy gate structure 225.

In the arrangement illustrated in FIG. 4A, the first active region 211A of the first semiconductor element 210A and a second active region 211B of the second semiconductor element 210B have the same length in the first direction. Also, a length of the dummy active region 221 in the first direction may be the same as a length of the first active region 211A and a length of the second active region 211B.

Referring to FIG. 4A, the third length LX3 may be less than the first length LX1, and the fourth length LX4 may be less than the second length LX2. This may be because a length of the dummy active region 221 may be less than a length of the first active region 211A, in the second direction, and a length of the dummy gate structure 225 may be substantially the same as a length of the first gate structure 215A, in the second direction. Therefore, each of the dummy source region and the dummy drain region may have a relatively small area, compared to each of the source region and the drain region. The expression "substantially the same" means that the dummy gate structure 225 and the first gate structure 215A may have the same length in consideration of an error that may be unintentionally generated during a process.

Active contacts 216A and 216B may be connected to active regions 211A and 211B, respectively. In contrast, no contact may be connected to the dummy active region 221. This may be because the dummy element 220 does not participate in an actual operation of the semiconductor device 200. As a result, since there is no need to connect a contact to the dummy active region 221, the dummy active region 221 may have a relatively small area, compared to each of the active regions 211A and 211B. For example, a length of each of the dummy source region and the dummy drain region in the second direction may be equal to or less than a length of each of the active contacts 216A and 216B.

Arrangement of the dummy element 220, a shape of the dummy element 220, and the like may be determined in consideration of an interval between the semiconductor elements 210A and 210B in the second direction. For example, when the interval between the semiconductor elements 210A and 210B is sufficient, an element having the same area as the active regions 211A and 211B may be disposed as a dummy element, rather than the dummy element 220 according to the arrangement illustrated in FIGS. 4A and 4B. In addition, the dummy element 220 may be provided as two or more dummy elements 220, or the dummy element 220 may include two or more dummy gate structures 225, depending on the interval between the semiconductor elements 210A and 210B.

Referring to FIG. 4B, the gate structures 215A and 215B may have the same structure as the dummy gate structure 225. For example, the first gate structure 215A may include a first gate insulating layer 212A, a first gate conductive layer 213A, and a first gate spacer 214A, and the dummy gate structure 225 may include a dummy gate insulating layer 222, a dummy gate conductive layer 223, and a dummy gate spacer 224. A thickness of the first gate insulating layer 212A may be the same as a thickness of the dummy gate insulating layer 222, and may be determined according to a magnitude of a power voltage supplied to the semiconductor elements 210A and 210B. In an embodiment, the first gate conductive layer 213A may have a multilayer structure in which different conductive materials are stacked.

Figure 5A:
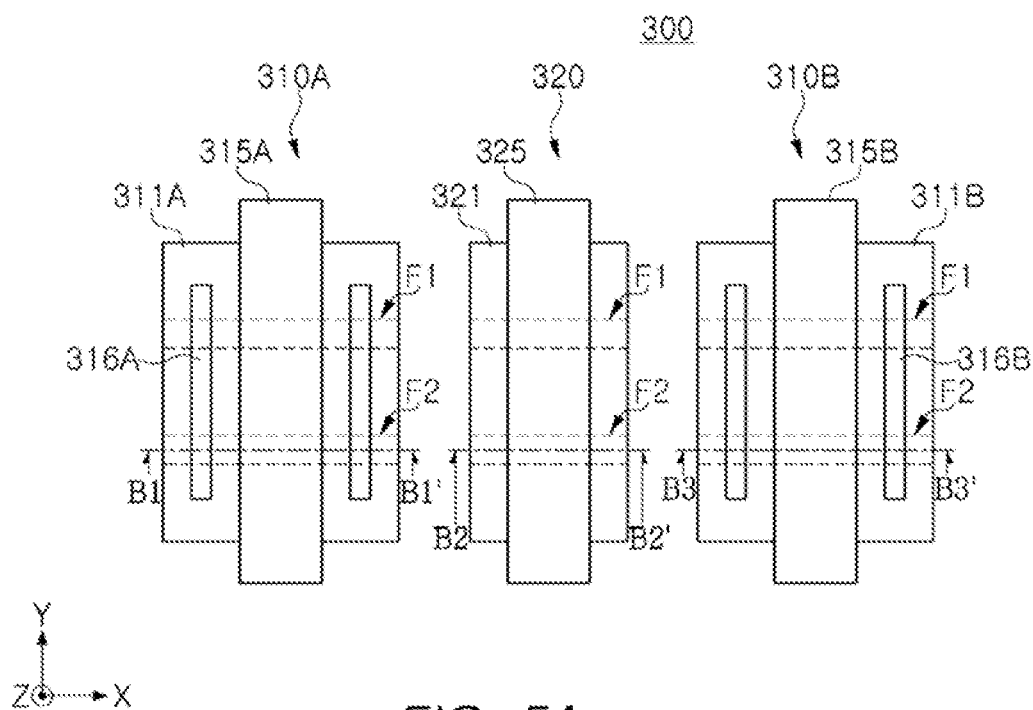
FIGS. 5A and 5B are schematic diagrams illustrating a semiconductor device according to an embodiment of the present inventive concept.
Figure 5B:
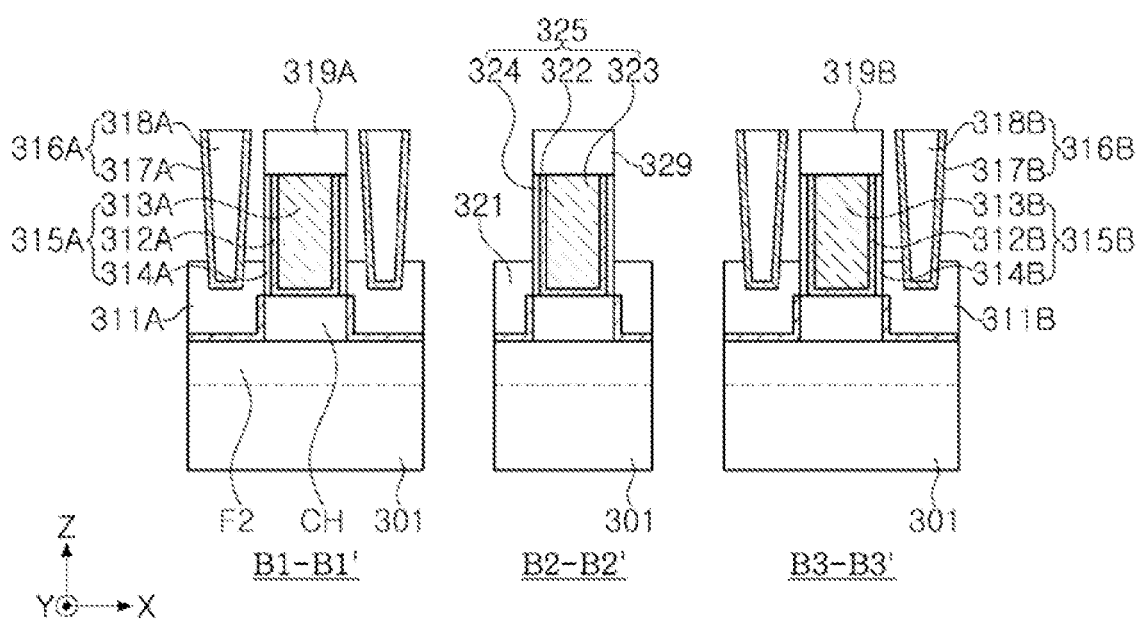

FIGS. 5A and 5B are views illustrating a semiconductor device according to an embodiment of the present inventive concept.

FIG. 5A is a plan view illustrating a partial portion of a semiconductor device 300, and FIG. 5B is a cross-sectional view illustrating cross-sections in directions B1-B1', B2-B2', and B3-B3' of FIG. 5A. In the arrangements illustrated in FIGS. 5A and 5B, channel regions of semiconductor elements 310A and 310B and a channel region of a dummy element 320 may be provided by fin structures F1 and F2 protruding from an upper surface of a substrate 301. In the arrangements illustrated in FIGS. 5A and 5B, each of the semiconductor elements 310A and 310B and the dummy element 320 is illustrated as including two fin structures F1 and F2. The number of fin structures included in a single element may be variously changed.

Referring to FIG. 5A, the semiconductor elements 310A and 310B may include gate structures 315A and 315B extending in the first direction (e.g., the Y-axis direction), respectively. Active regions 311A and 311B may be disposed on opposite sides of each of the gate structures 315A and 315B, respectively, and active contacts 316A and 316B may be connected to the active regions 311A and 311B, respectively.

As illustrated in FIG. 5B, the active regions 311A and 311B may extend from the fin structures F1 and F2 protruding upward from the upper surface of the substrate 301, rather than from inside the substrate 301. For example, the active regions 311A and 311B may be formed by performing a selective epitaxial growth process on at least a portion of the fin structures F1 and F2.

Each of the gate structures 315A and 315B may extend across the fin structures F1 and F2 extending in the second direction (e.g., the X-axis direction). Therefore, as illustrated in FIG. 5B, each of the gate structures 315A and 315B may pass over the fin structures F1 and F2, and an area of a channel region may be increased to increase a degree of integrity of the semiconductor device 300. The first gate structure 315A may include a first gate insulating layer 312A, a first gate conductive layer 313A, and a first gate spacer 314A, and a capping layer 319A may be disposed on the first gate structure 315A. According to embodiments, the first gate conductive layer 313A may have a multilayer structure in which different conductive materials are stacked. A structure of the second gate structure 315B may be similar to that of the first gate structure 315A.

A dummy gate structure 325 and a dummy active region 321 may have a structure similar to that of the gate structures 315A and 315B and the active regions 311A and 311B), respectively. A length of the dummy active region 321 may be less than a length of each of the active regions 311A and 311B, in the second direction. This may be because there is no need to connect a contact to the dummy active region 321 due to characteristics of the dummy element 320 that might not be involved in an actual operation of the semiconductor device 300. The dummy element 320 may be disposed between the semiconductor elements 310A and 310B to form a uniform interval between the gate structures 315A and 315B and the dummy gate structure 325 in the second direction as well as a uniform interval between the active regions 311A and 311B and the dummy active region 321. Therefore, yield may be increased and characteristics of the semiconductor device 300 may be made more desirable.

The semiconductor elements and dummy elements described with reference to FIGS. 4A to 5B are illustrated as general horizontal transistors and FINFETs. The dummy element, according to an embodiment of the present inventive concept, may also be applied to other semiconductor elements having various structures. For example, a dummy element, according to an embodiment of the present inventive concept, may be also applied to a gate-all-around (GAA) type transistor or a multi-bridge-channel (MBC) type transistor, having a structure in which a plurality of channels are disposed on a substrate and a gate structure surrounds at least a portion thereof.

FIGS. 6 to 10 are views illustrating a semiconductor device according to an embodiment of the present inventive concept.

Figure 6:
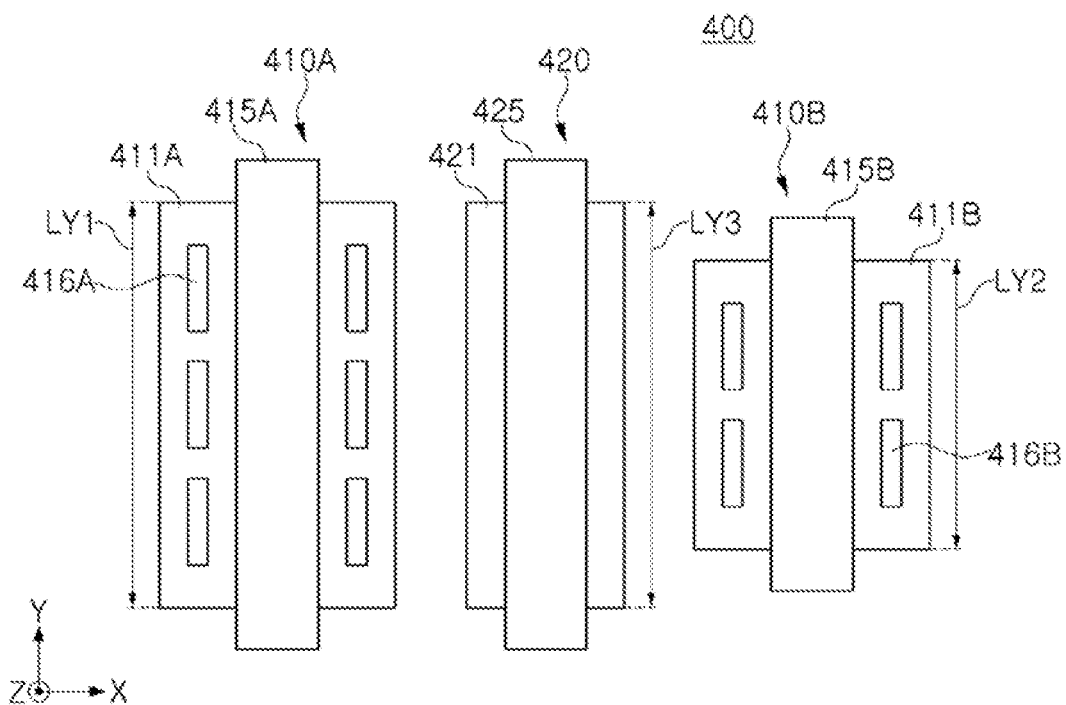
FIGS. 6 to 10 are schematic diagrams illustrating a semiconductor device according to an embodiment of the present inventive concept.

Referring first to FIG. 6, a semiconductor device 400 may include semiconductor elements 410A and 410B and a dummy element 420 disposed therebetween. A first semiconductor element 410A and a second semiconductor element 410B may have different lengths in the first direction (e.g., the Y-axis direction). For example, in the first direction, a first active region 411A of the first semiconductor element 410A may have a first length LY1, and a second active region 411B of the second semiconductor element 410B may have a second length LY2. Due to a difference in length between the active regions 411A and 411B, the number of first active contacts 416A connected to the first active region 411A and the number of second active contacts 416B connected to the second active region 411B may be different.

An area of a dummy active region 421 included in the dummy element 420 may be determined by an area of the active regions 411A and 411B included in a pair of adjacent semiconductor elements 410A and 410B. For example, at least one of boundaries of the active regions 411A and 411B included in the pair of semiconductor elements 410A and 410B may be located in the same position as at least one of boundaries of the dummy active region 421 in the first direction. Referring to FIG. 6, upper and lower boundaries of the dummy active region 421 may be disposed in the same position as upper and lower boundaries of the first active region 411A included in the first semiconductor element 410A, in the first direction.

Therefore, a length of the dummy active region 421 in the first direction may be determined by at least one of the first active region 411A and the second active region 411B. For example, a length of the dummy active region 421 in the first direction may be determined as a length of a longer region, among the first active region 411A and the second active region 411B. Therefore, as illustrated in FIG. 6, a third length LY3 of the dummy active region 421 may be equal to the first length LY1.

Figure 7:
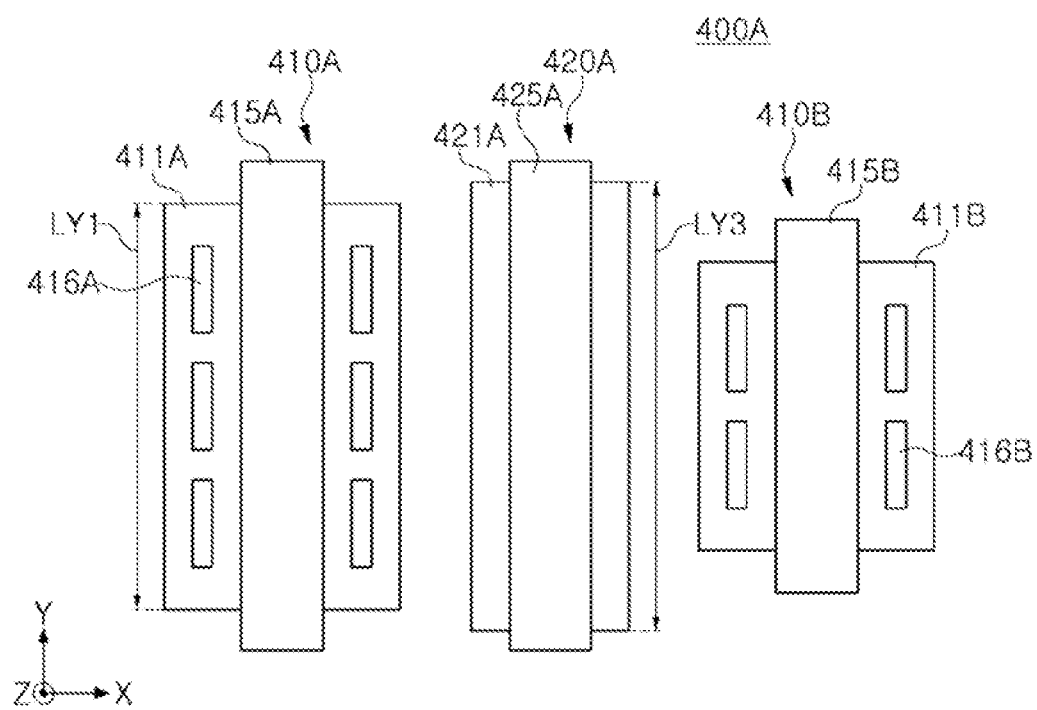

Also, in a semiconductor device 400A, according to the arrangement illustrated in FIG. 7, a length of a dummy active region 421A in the first direction may be determined by a first active region 411A and a second active region 411B. In the arrangement illustrated in FIG. 7, a length of the dummy active region 421A may be different from a length of the first active region 411A and a length of the second active region 411B, in the first direction. Referring to FIG. 7, a third length LY3 of the dummy active region 421A in the first direction may be longer than a first length LY1 of the first active region 411A, and as a result, a length of the dummy active region 421A may be longer than a length of each of the first active region 411A and the second active region 411B.

Figure 8:
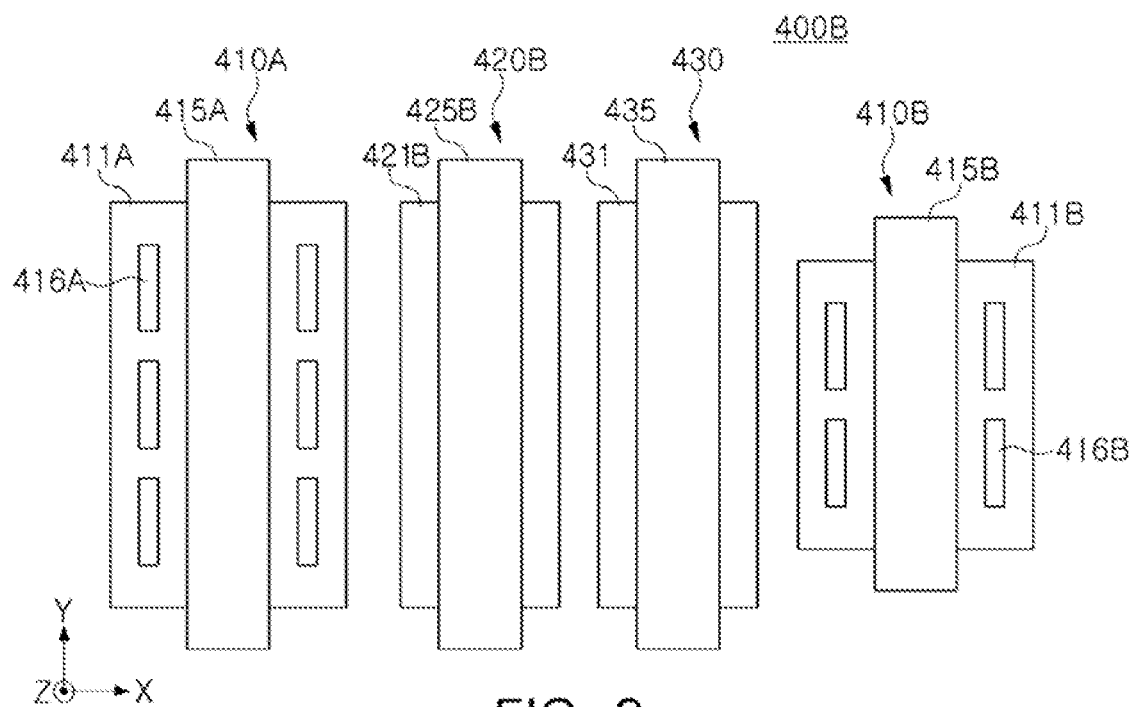

Next, referring to FIG. 8, in a semiconductor device 400B, two dummy elements 420B and 430 may be disposed between a first semiconductor element 410A and a second semiconductor element 410B, adjacent to each other in the second direction. This may be because an interval between the semiconductor elements 410A and 410B may be longer than that of the arrangements described with reference to FIGS. 6 and 7. Alternatively, the interval between the semiconductor elements 410A and 410B may be substantially the same as in the embodiments described with reference to FIGS. 6 and 7, but design rules for determining an interval between gate structures and an interval between active regions may be different.

Although the dummy elements 420B and 430 are illustrated in FIG. 8 as having the same size, the dummy elements 420B and 430 may have different sizes. For example, a first dummy active region 421B of a first dummy element 420B may have a longer length than a first active region 411A in the first direction, and a second dummy active region 431 of a second dummy element 430 may have the same length as the first active region 411A in the first direction.

The first dummy active region 421B may have the same length as the first active region 411A, and the second dummy active region 431 may have a longer length than the first active region 411A, in the first direction. Alternatively, both the first dummy active region 421B and the second dummy active region 431 may be longer than the first active region 411A, in the first direction, or at least one of the first dummy active region 421B or the second dummy active region 431 may have a shorter length than the first active region 411A, in the first direction.

Figure 9:
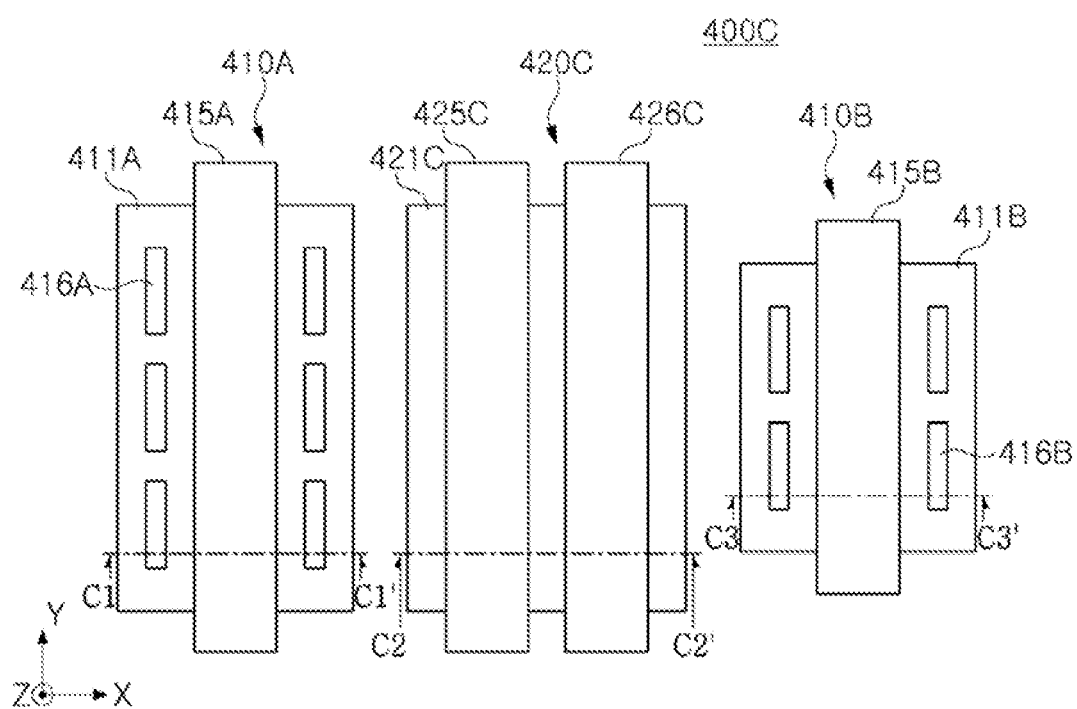
Figure 10:
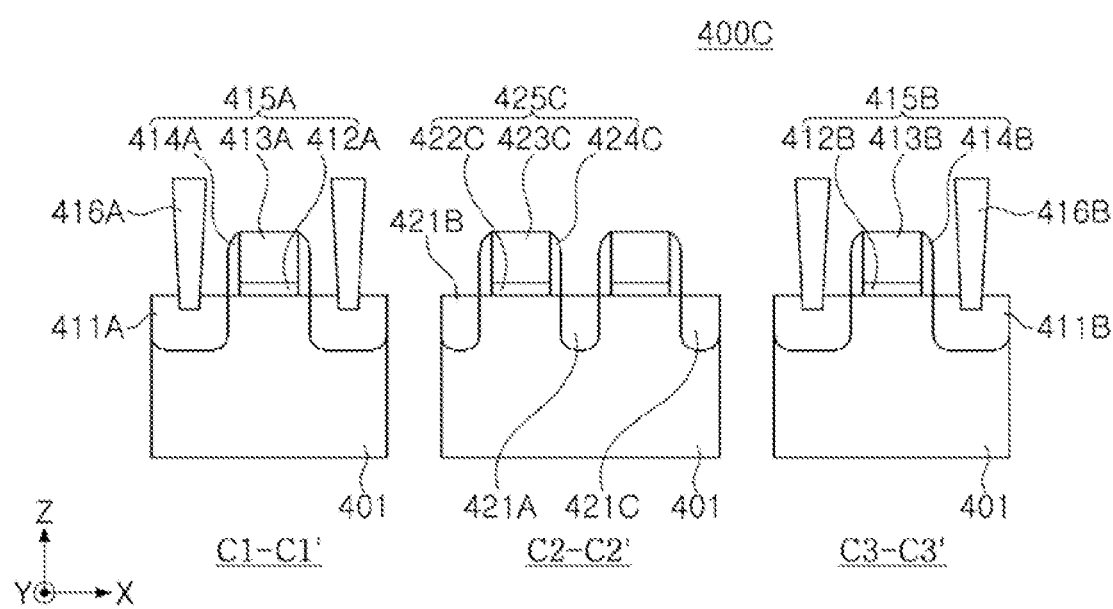

In a semiconductor device 400C according to an arrangement illustrated in FIGS. 9 and 10, a dummy element 420C may include two or more dummy gate structures 425C and 426C. The dummy gate structures 425C and 426C may extend in the first direction, and may be separated from each other in the second direction. Dummy active regions 421A to 421C may be formed on opposite sides of the dummy gate structures 425C and 426C. Therefore, a first dummy active region 421A may be also disposed between a first dummy gate structure 425C and a second dummy gate structure 426C.

Referring to FIG. 10 illustrating cross-sections in directions C1-C1 C2-C2', and C3-C3' of FIG. 9, the dummy gate structures 425C and 426C may have the same structure. Also, the first dummy active region 421A disposed between the dummy gate structures 425C and 426C may have a smaller area than a second dummy active region 421B and a third dummy active region 421C. This may be because a length of the first dummy active region 421A is less than a length of the second dummy active region 421B and a length of the third dummy active region 421C, in the second direction, due to an interval between the dummy gate structures 425C and 426C. For example, an interval between the dummy gate structures 425C and 426C may be equal to or less than a length of an active contact 416A and a length of an active contact 416B, in the second direction. According to embodiments, a dummy active region 421 might not be formed between the dummy gate structures 425C and 426C. For example, except for the first dummy active region 421A, only the second dummy active region 421B and the third dummy active region 421C might be formed.

The arrangements described with reference to FIGS. 6 to 10 may be applied to each other in some configurations. For example, in the embodiment described with reference to FIGS. 9 and 10, a dummy active region 421 of the dummy element 420C may have a length, longer or shorter than a length of the first semiconductor element 410A, in the first direction.

Figure 11:
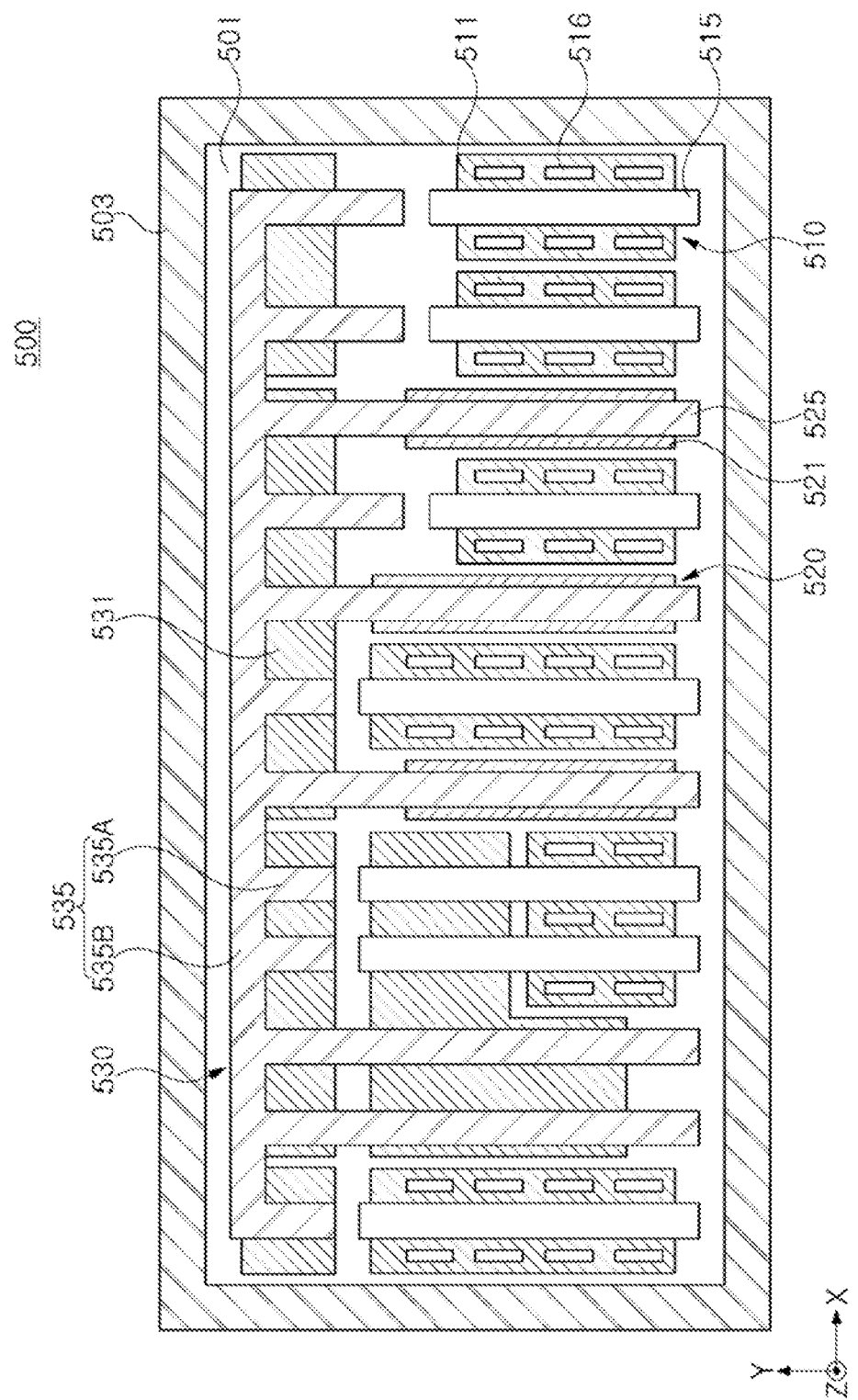
FIG. 11 is a plan view illustrating a semiconductor device according to an embodiment of the present inventive concept.

FIG. 11 is a plan view illustrating a semiconductor device according to an embodiment of the present inventive concept.

Referring to FIG. 11, a semiconductor device 500, according to an embodiment of the present inventive concept, may include a plurality of semiconductor elements 510 and dummy elements 520 and 530, formed on a substrate 501. The plurality of semiconductor elements 510 may operate with a power voltage of a predetermined range, and may be disposed in a guard pattern 503 formed on the substrate 501. The guard pattern 503 may be a separator having a predetermined width and a predetermined depth, and different power voltages may be applied to or well regions doped with impurities of different conductivity types may be formed on an inside and an outside of the guard pattern 503.

The plurality of semiconductor elements 510 may be transistors. Each of the semiconductor elements 510 may include a gate structure 515 extending in the first direction (e.g., the Y-axis direction), and an active region 511 disposed on opposite sides of the gate structure 515. An active contact 516 may be connected to the active region 511, and the active contact 516 may be connected to at least one of wiring patterns disposed on the semiconductor elements 510. The gate structure 515 may also be connected to at least one of the wiring patterns.

The dummy elements 520 and 530 may be disposed between the semiconductor elements 510. For example, the dummy elements 520 and 530 may include a first dummy element 520 and a second dummy element 530. The first dummy element 520 may include a first dummy gate structure 525 and a first dummy active region 521, and the second dummy element 530 may include a second dummy gate structure 535 and a second dummy active region 531. According to embodiments, the second dummy element 530 may be omitted, and only the first dummy element 520 might be disposed between the semiconductor elements 510.

The first dummy element 520 and the second dummy element 530 may be classified according to a position to be arranged. For example, the first dummy element 520 may be disposed to be adjacent to at least one of the semiconductor elements 510 in the second direction (e.g., the X-axis direction). The second dummy element 530 may be disposed to be adjacent to at least one of the semiconductor elements 510 in the first direction.

Alternatively, the first dummy element 520 and the second dummy element 530 may be classified according to areas of the dummy active regions 521 and 531. Referring to FIG. 11, an area of the first dummy active region 521 included in the first dummy element 520 may be smaller than an area of the second dummy active region 531 included in the second dummy element 530. For example, a length of each of the first dummy active regions 521 from opposite sides of the first dummy gate structure 525 may be less than a length of each of the second dummy active regions 531 from opposite sides of the second dummy gate structure 535, in the second direction.

A plurality of second dummy gate structures 535 providing the second dummy element 530 may include a first dummy gate region 535A extending in the first direction and a second dummy gate region 535B extending in the second direction, respectively. The second dummy gate region 535B may connect two or more first dummy gate regions 535A to each other. Since the second dummy element 530 does not interfere with an actual operation of the semiconductor device 500, a second dummy gate region 535B connecting the first dummy gate regions 535A as a single one may be formed. The second dummy gate region 535B may be disposed to be adjacent to the guard pattern 503.

In the arrangement illustrated in FIG. 11, it is illustrated that the first dummy element 520 is disposed only between a pair of semiconductor elements 510 in the second direction. According to embodiments, arrangement of the first dummy element 520 may be changed. For example, the first dummy element 520 might not be disposed between the semiconductor elements 510, and might be disposed only between one of the semiconductor elements 510 and the guard pattern 503 in the second direction. In this case, the first dummy element 520 may be adjacent to one of the semiconductor elements 510 on one side, and may be adjacent to the guard pattern 503 on the other side, in the second direction.

Figure 12:
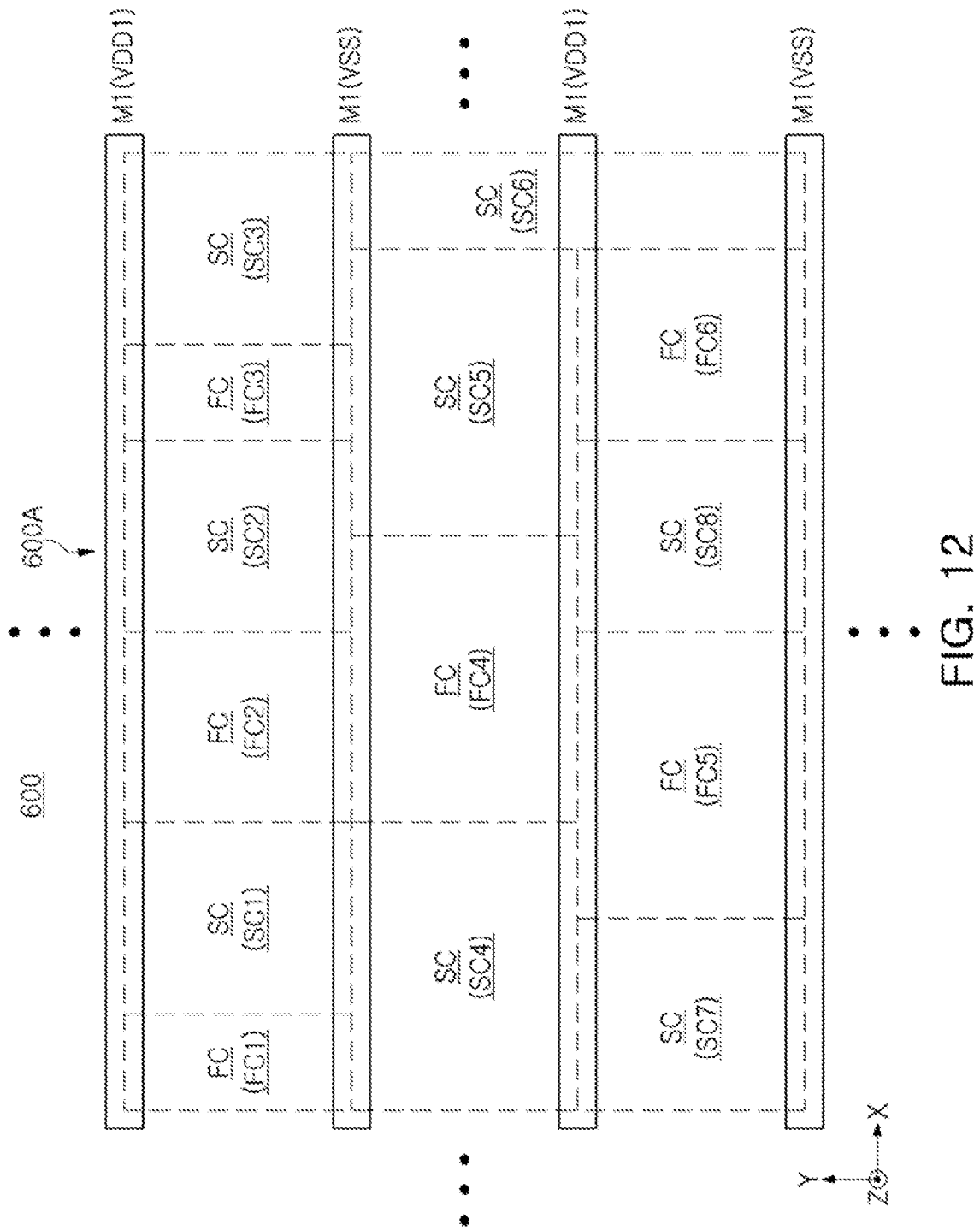
FIGS. 12 and 13 are plan views illustrating a semiconductor device according to an embodiment of the present inventive concept.
Figure 13:
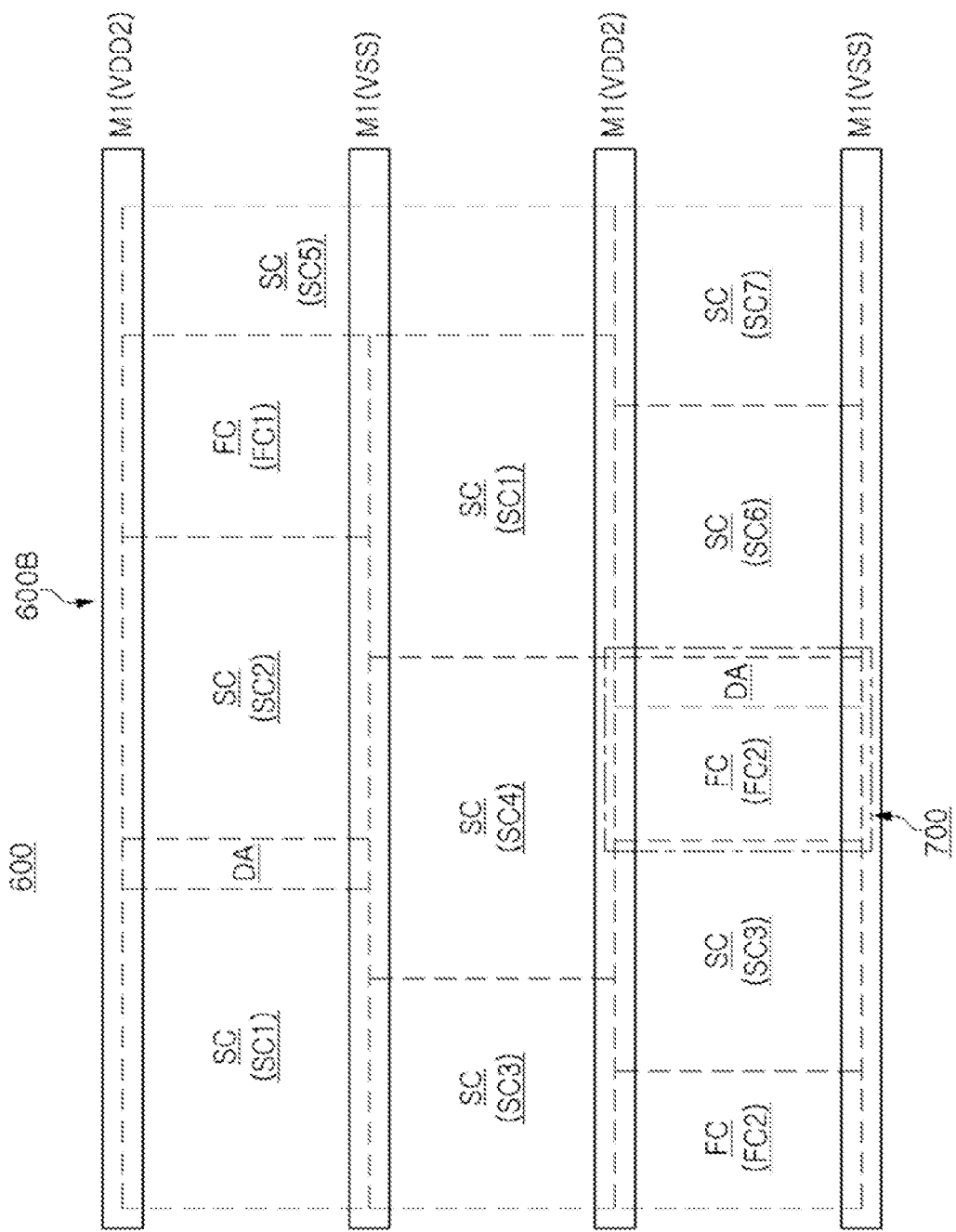

FIGS. 12 and 13 are plan views illustrating a semiconductor device according to an embodiment of the present inventive concept.

Referring to FIGS. 12 and 13, a semiconductor device 600 may include standard cell regions SC and filler cell regions FC. Standard cells may be disposed in the standard cell regions SC to implement semiconductor devices and/or circuits, which actually operate, and filler cells may be disposed in the filler cell regions FC.

In an arrangement illustrated in FIG. 12, first to eighth standard cells SC1 to SC8 are illustrated as being disposed in the standard cell regions SC, but this arrangement is illustrative, and types and the number of standard cells, disposed in the standard cell regions SC, may be variously changed. Similarly, although it is illustrated that first to sixth filler cells FC1 to FC6 are disposed in the filler cell regions FC, various other filler cells may be disposed in the filler cell regions FC.

Next, referring to FIG. 13, first to seventh standard cells SC1 to SC7 may be disposed in standard cell regions SC, and first and second filler cells FC1 and FC2 may be disposed in filler cell regions FC. Even in an arrangement illustrated in FIG. 13, types and the number of standard cells and filler cells may be variously changed.

A first voltage region 600A of the semiconductor device 600 illustrated in FIG. 12 and a second voltage region 600B of the semiconductor device 600 illustrated in FIG. 13 may operate with different power voltages. For example, the first voltage region 600A may include power wiring patterns M1 (VDD1) and M1 (VSS), which may be separated from each other in the first direction (e.g., the Y-axis direction), and the second voltage region 600B may also include power wiring patterns M1 (VDD2) and M1 (VSS). A first power voltage supplied to the power wiring patterns M1 (VDD1) and M1 (VSS) of the first voltage region 600A may be different from a second power voltage supplied to the power wiring patterns M1 (VDD2) and M1 (VSS) of the second voltage region 600B. For example, the first power voltage may be greater than the second power voltage.

Due to a difference in power voltage, a design shape of the first voltage region 600A and a design shape of the second voltage region 600B may also be changed. For example, referring to FIG. 13, unlike the arrangement illustrated in FIG. 12, a dummy region DA different from the filler cell regions FC may exist. The dummy region DA, which exists between the standard cell regions SC, may have an area that may be small enough that the filler cell regions FC1 and FC2 cannot be inserted. For example, a length of the dummy region DA in the second direction may be less than a length of each of the standard cell regions SC and a length of each of the filler cell regions FC. For example, a space with which the standard cell regions SC and the filler cell regions FC are not filled may be generated as the dummy region DA, in a process of designing layout of the semiconductor device 600 by arranging the standard cell regions SC and the filler cell regions FC.

In an embodiment of the present inventive concept, at least one dummy element may be disposed in a dummy region DA existing in a portion of a semiconductor device 600, to homogenize a deviation in interval between gate structures and a deviation in interval between active regions. In this case, the interval between the gate structures and the interval between the active regions may be intervals defined in the second direction.

In the embodiments illustrated in FIGS. 12 and 13, elements included in the filler cells disposed in the filler cell regions FC might not participate in the actual operation of the semiconductor device 600, and thus may be also defined as dummy elements. Dummy elements included in filler cells stored in a standard library in advance and dummy elements disposed in a dummy region DA generated during a process of designing a layout, for example, during a process of a place-and-routing (P&R), may have different characteristics. Hereinafter, it will be described in more detail with reference to FIG. 14.

Figure 14:
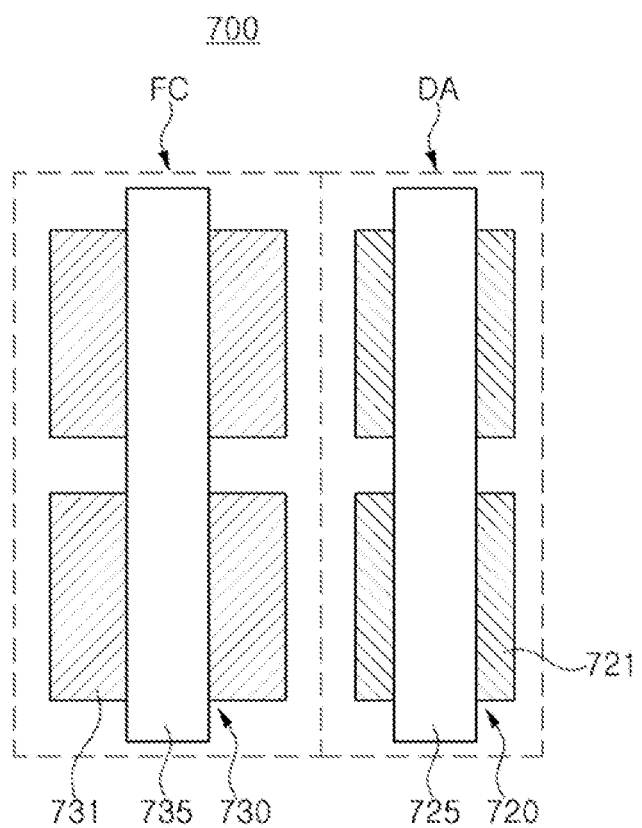
FIG. 14 is an enlarged view illustrating a partial portion of FIG. 13.

FIG. 14 is an enlarged view illustrating a partial portion of FIG. 13.

FIG. 14 is an enlarged view illustrating a partial portion 700 of FIG. 13. As illustrated in FIG. 13, a partial portion 700 may include a filler cell region FC in which the second filler cell region FC2 is disposed, and a dummy region DA.

Referring to FIG. 14, a first dummy element 720 may be disposed in the dummy region DA and a second dummy element 730 may be disposed in the filler cell region FC. The first dummy element 720 and the second dummy element 730 may include dummy active regions 721 and 731, separated from each other, in the first direction (e.g., the Y-axis direction), respectively, and doped with impurities of different conductivity types. For example, in the first direction, upper portions of the dummy active regions 721 and 731 may be doped with a P-type impurity, and lower portions of the dummy active regions 721 and 731 may be doped with an N-type impurity.

The first dummy element 720 may include a first dummy gate structure 725, and the second dummy element 730 may include a second dummy gate structure 735. The dummy gate structures 725 and 735 may extend in the first direction, and may intersect the dummy active regions 721 and 731, respectively. In the arrangement illustrated in FIG. 14, it is illustrated that the first dummy gate structure 725 and the second dummy gate structure 735 have the same length in the first direction and the second direction. According to embodiments, the first dummy gate structure 725 and the second dummy gate structure 735 may have different lengths in at least one of the first direction or the second direction.

As illustrated in FIG. 14, an area of the first dummy active region 721 disposed in the dummy region DA may be smaller than an area of the second dummy active region 731 disposed in the filler cell region FC. For example, a length of each of the first dummy active regions 721 extending from opposite sides of the first dummy gate structure 725 may be less than a length of each of the second dummy active regions 731 extending from opposite sides of the second dummy gate structure 735, in the second direction.

This may be because a space with which standard cells and filler cells are not filled is defined as a dummy region DA, and the first dummy element 720 is disposed, in a process of designing layout of the semiconductor device 600 by arranging the standard cells and the filler cells. A region having an area sufficient to dispose the second dummy element 730 disposed in the filler cell region FC might not be defined as the dummy region DA, and one of the filler cells may be disposed in the corresponding region. As suggested in an embodiment of the present inventive concept, a first dummy element 720 that might not be included in a filler cell included in a standard library may be disposed in a small area such that the filler cell cannot be disposed. Therefore, a deviation in interval between gate structures and a deviation in interval between active regions may be reduced.

Figure 15:
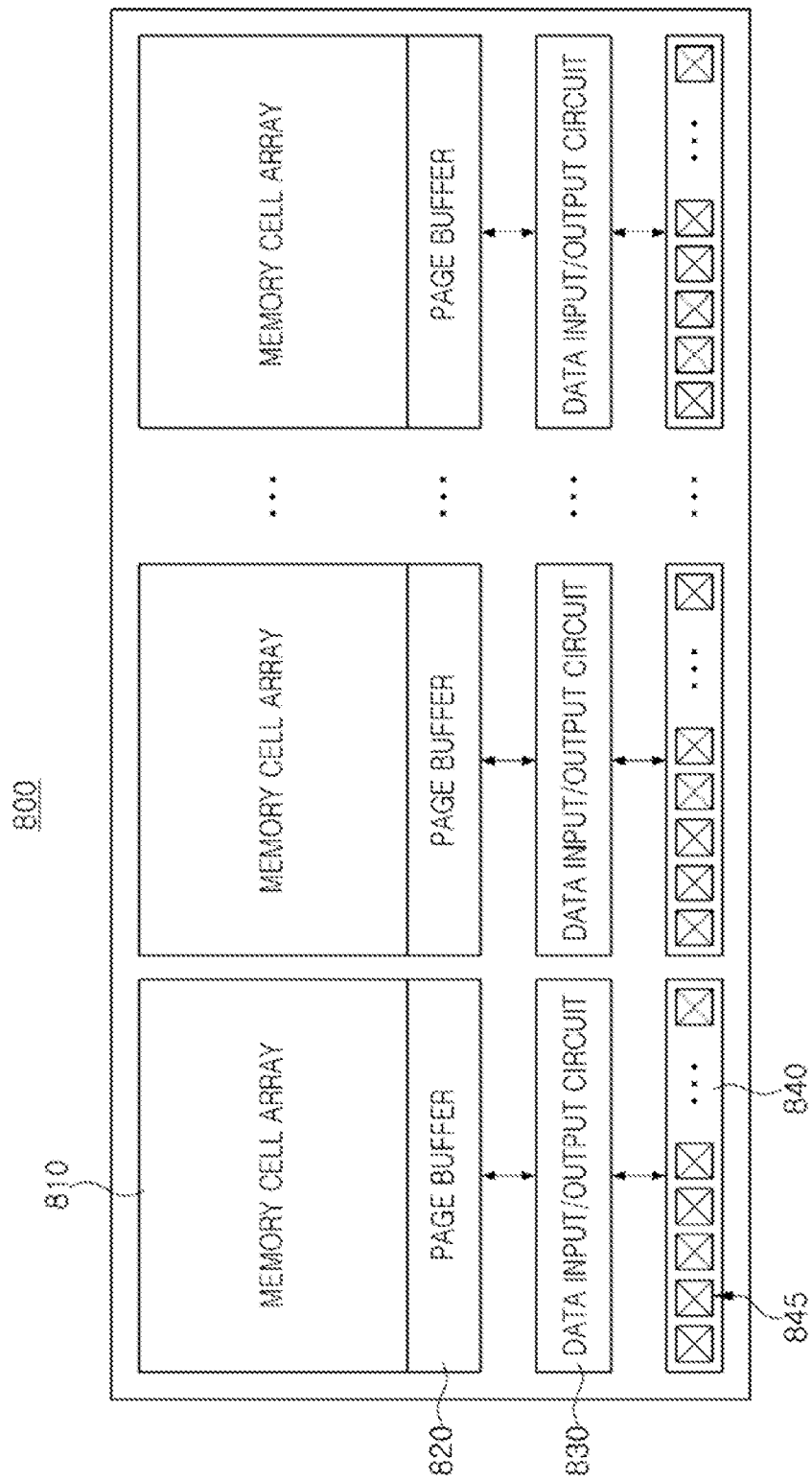
FIGS. 15 and 16 are block diagrams illustrating memory devices according to an embodiment of the present inventive concept.
Figure 16:
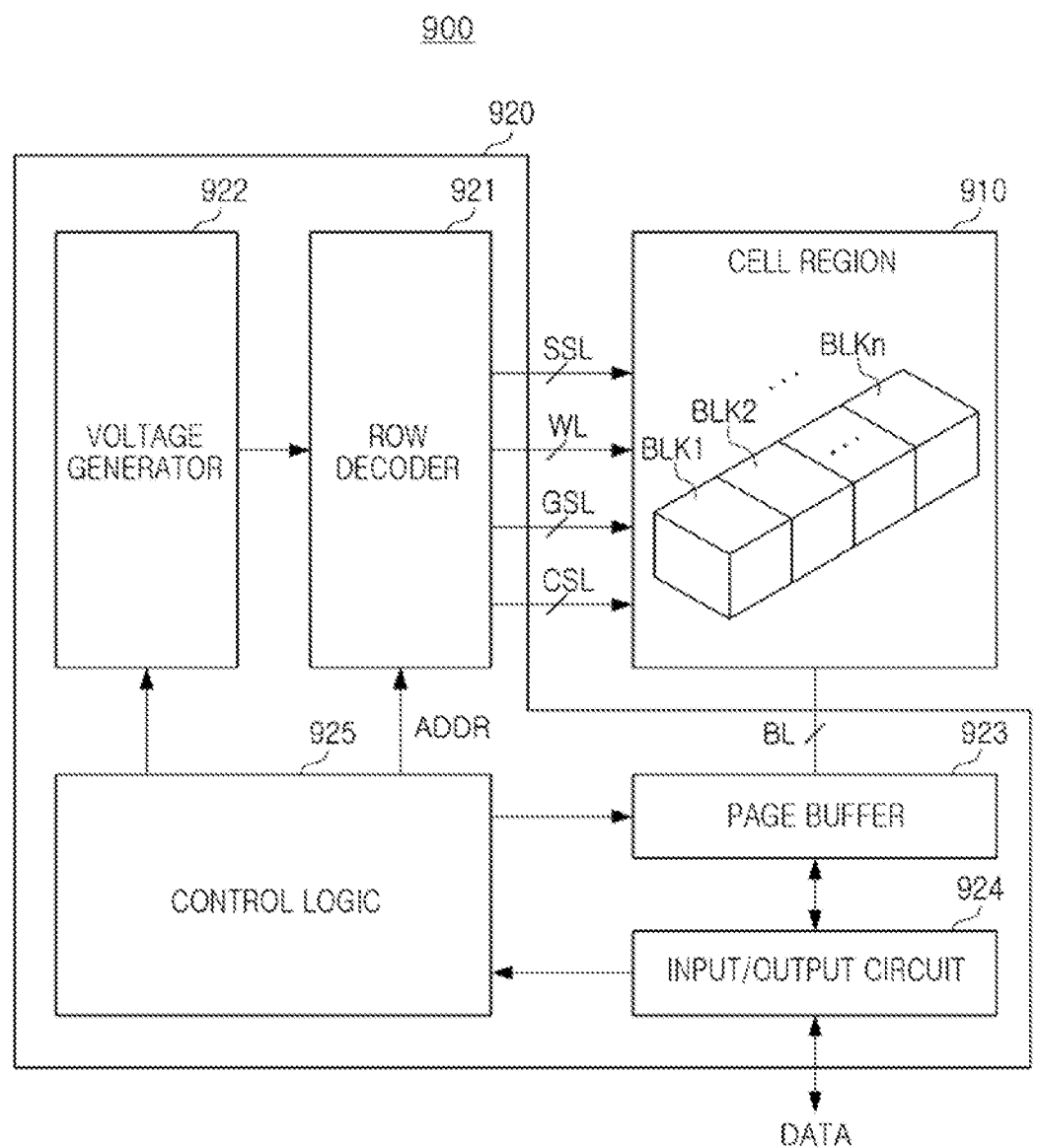

FIGS. 15 and 16 are block diagrams schematically illustrating memory devices according to an embodiment of the present inventive concept.

Referring to FIG. 15, a memory device 800, according to an embodiment of the present inventive concept, may include a plurality of memory planes, each of which may include a memory cell array 810, a page buffer 820, a data input/output circuit 830, and the like. The memory cell array 810 may include a plurality of blocks, and each of the plurality of blocks may include a plurality of memory cells. The plurality of memory cells may be connected to the page buffer 820 through various bit lines.

The page buffer 820 may be connected to a data pad unit 840 through the data input/output circuit 830. The data pad unit 840 may include a plurality of pads 845, the data pad unit 840 may receive data to be written to the memory device 800 through the pads 845, and the data pad unit 840 may output data requested by an external controller. For example, the pads 845 connected to the page buffer 820 through the data input/output circuit 830 may be data pads for transmitting and receiving data signals.

In an arrangement illustrated in FIG. 15, the data input/output circuit 830 may include a plurality of semiconductor elements, and wiring patterns for connecting the plurality of semiconductor elements to implement a circuit, and at least a portion of the plurality of semiconductor elements may be disposed in a low voltage region. The low voltage region may be a region operated by a relatively small power voltage, and the plurality of semiconductor elements constituting the page buffer 820 and the data input/output circuit 830 may be classified as a low voltage region and a high voltage region, depending on a level of a power voltage required for operation, and may be arranged.

The data input/output circuit 830 may be implemented in the low voltage region such that the memory device 800 may input/output data at high speed. Semiconductor elements formed in the low voltage region may have a relatively small size, compared to semiconductor elements formed in the high voltage region. Therefore, an interval between gate structures and an interval between active regions in the low voltage region may also be different from those in the high voltage region.

In an embodiment of the present inventive concept, a deviation in interval between gate structures and a deviation in interval between active regions may be minimized in the low voltage region, and dummy elements not defined in the standard library may be used as filler cells, to reduce the number of cases of which an interval between the gate structures and an interval between the active regions may have. As described above with reference to FIGS. 12 to 14, a dummy element not included in filler cells may have a smaller size than a dummy element included in predefined filler cells. Therefore, a dummy element not included in filler cells may be disposed in a space not filled with only standard cells and filler cells, and a deviation in interval between gate structures and a deviation in interval between active regions may be reduced. In addition, by reducing the number of cases of which an interval between the gate structures and an interval between the active regions may have, yield may be increased and characteristics of semiconductor elements in a low voltage region may be made more desirable.

Next, referring to FIG. 16, a memory device 900 may include a cell region 910 and a peripheral circuit region 920. The peripheral circuit region 920 may include a row decoder 921, a voltage generator 922, a page buffer 923, an input/output circuit 924, a control logic 925, and the like.

The cell region 910 may include a plurality of memory cells and may be classified as a plurality of blocks BLK1 to BLKn. The plurality of memory cells may be connected to the row decoder 921 through a string select line SSL, a word line WL, a ground select line GSL, and a common source line CSL, and may be connected to the page buffer 923 through bit lines BL.

The row decoder 921 may decode address data ADDR received from the control logic 925 or the like, and may input voltages for driving the string select line SSL, the word line WL, the ground select line GSL, and the common source line CSL to the cell region 910. The voltage generator 922 may generate a voltage necessary for an operation of the memory device 900 in response to control of the control logic 925. For example, the peripheral circuit region 920 may be divided into a high voltage region and a low voltage region according to a level of a power voltage input to semiconductor elements. According to an embodiment, the peripheral circuit region 920 may further include a middle voltage region receiving a power voltage, lower than a power voltage of the high voltage region and higher than a power voltage of the low voltage region.

The input/output circuit 924 may receive data DATA during a program operation, and may transfer the data DATA to the page buffer 923, and the page buffer 923 may output data DATA read from the cell region 910 externally during a read operation. The input/output circuit 924 may transfer an address or a command input from an external controller to the control logic 925.

In order to increase an input/output speed of the memory device 900, semiconductor elements included in the input/output circuit 924 may operate with a relatively low power voltage. For example, the semiconductor elements of the input/output circuit 924 may be implemented in the low voltage region, and thus the semiconductor elements of the input/output circuit 924 may have a relatively small size. For example, an area of an active region, a thickness of a gate insulating layer included in a gate structure, or the like in the low voltage region may be less than those of semiconductor elements disposed in the high voltage region and the middle voltage region.

In order to implement an input/output circuit 924 in the low voltage region, a design rule different from that in the high voltage region and the middle voltage region may be applied to the input/output circuit 924. For example, a lambda design rule might not be applied to a standard cell stored in a standard library, due to sizes of the semiconductor elements disposed in the low voltage region. As a result, in the process of implementing the input/output circuit 924 in the low voltage region, a space that might not be filled with only standard cells and filler cells may be generated, which may lead to an increase in the number of cases of which an interval between gate structures and an interval between active regions may have.

According to an embodiment of the present inventive concept, a dummy element having an active region having a relatively small area, compared to a semiconductor element actually operated in the input/output circuit 924, may be disposed between semiconductor elements, as necessary. For example, a dummy element may be disposed between a pair of semiconductor elements adjacent to each other, in the second direction intersecting the first direction, an extension direction of the gate structure, and parallel to an upper surface of a substrate. Therefore, by reducing a deviation in interval between gate structures defined in the second direction and reducing the number of cases in which the interval between the gate structures may have, characteristics of the semiconductor devices may be made more desirable and yield may be increased. In addition, an effect of reducing a deviation in interval between active regions may also be expected.

Figure 17:
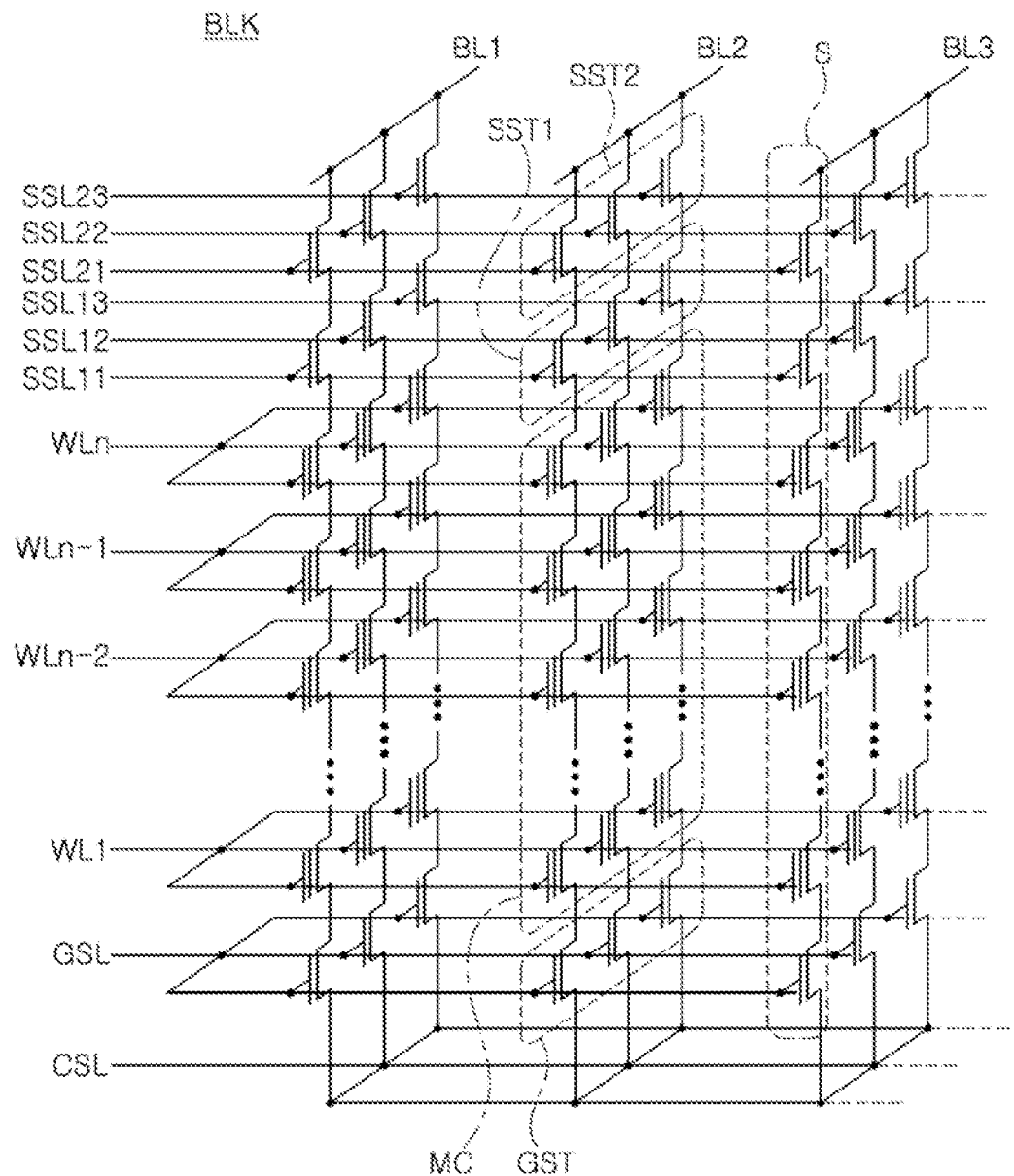
FIG. 17 is a circuit diagram schematically illustrating a memory cell array of a memory device according to an embodiment of the present inventive concept.

FIG. 17 is a circuit diagram illustrating a memory cell array of a memory device according to an embodiment of the present inventive concept.

Referring to FIG. 17, a memory block BLK may include a plurality of memory cell strings S, and at least a portion of the memory cell strings S may share word lines WL1 to WLn and/or bit lines BL1 to BL3.

Each of the memory cell strings S may include a plurality of memory cells MC connected between first and second string select transistors SST1 and SST2 and a ground select transistor GST. The first and second string select transistors SST1 and SST2 may be connected in series with each other, and the second string select transistor SST2 disposed in an upper portion of the memory block BLK may be connected to one of the bit lines BL1 to BL3. The ground select transistor GST may be connected to the common source line CSL. The memory cells MC included in each of the memory cell strings S may share a single channel region.

The plurality of memory cells MC may be connected in series between the first and second string select transistors SST1 and SST2 and the ground select transistor GST. According to embodiments, the number of the string select transistors SST1 and SST2 and the number of the ground select transistor GST may be variously changed, and each of the memory cell strings S may further include at least one dummy memory cell. For example, the dummy memory cell may be connected between the first string select transistor SST1 and the memory cells MC and/or between the ground select transistor GST and the memory cells MC.

Gate electrodes of the plurality of memory cells MC may be connected to the word lines WL1 to WLn. Also, a gate electrode of the ground select transistor GST may be connected to the ground select line GSL, and gate electrodes of the first and second string select transistors SST1 and SST2 may be connected to string select lines SSL11 to SSL23.

The ground select line GSL, the word lines WL1 to WLn, and the string select lines SSL11 to SSL23 may be stacked in the first direction, perpendicular to the upper surface of the substrate. The ground select line GSL, the word lines WL1 to WLn, and the string select lines SSL11 to SSL23 may be passed through by a channel structure including a channel region. The channel structure may be connected to one of the bit lines BL1 to BL3.

Figure 18:
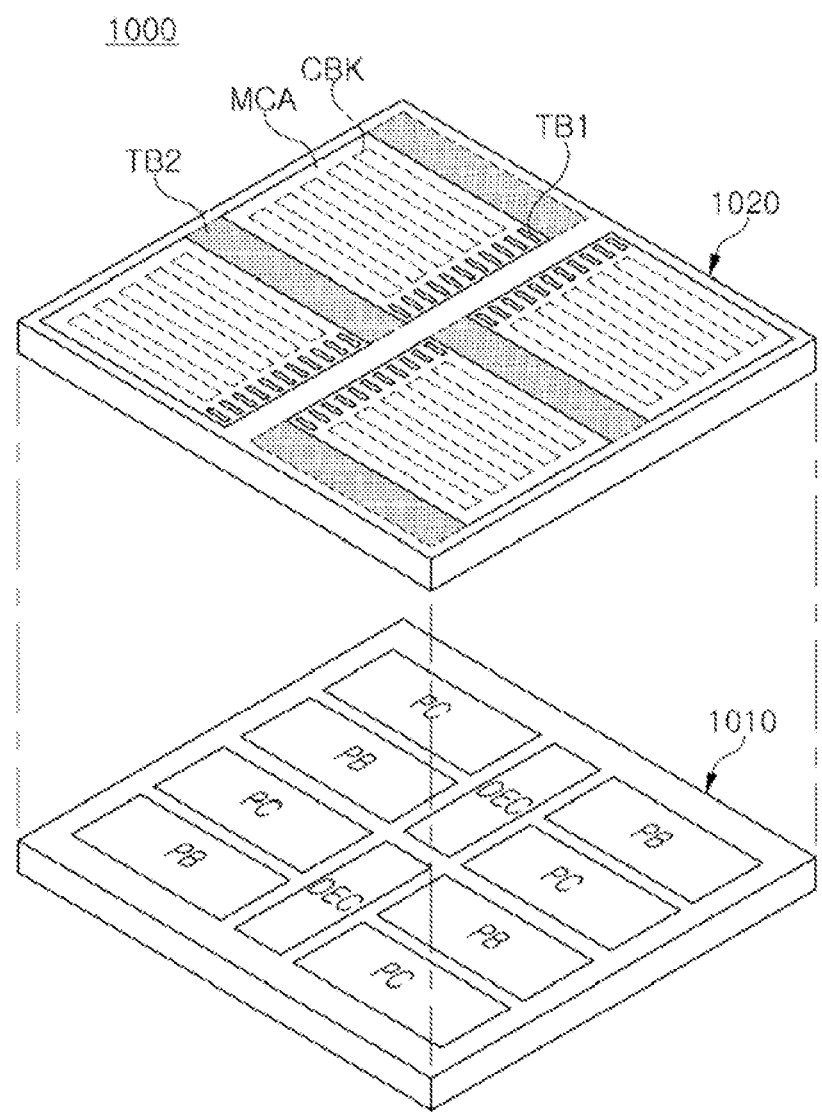
FIGS. 18 and 19 are views illustrating a memory device according to an embodiment of the present inventive concept.
Figure 19:
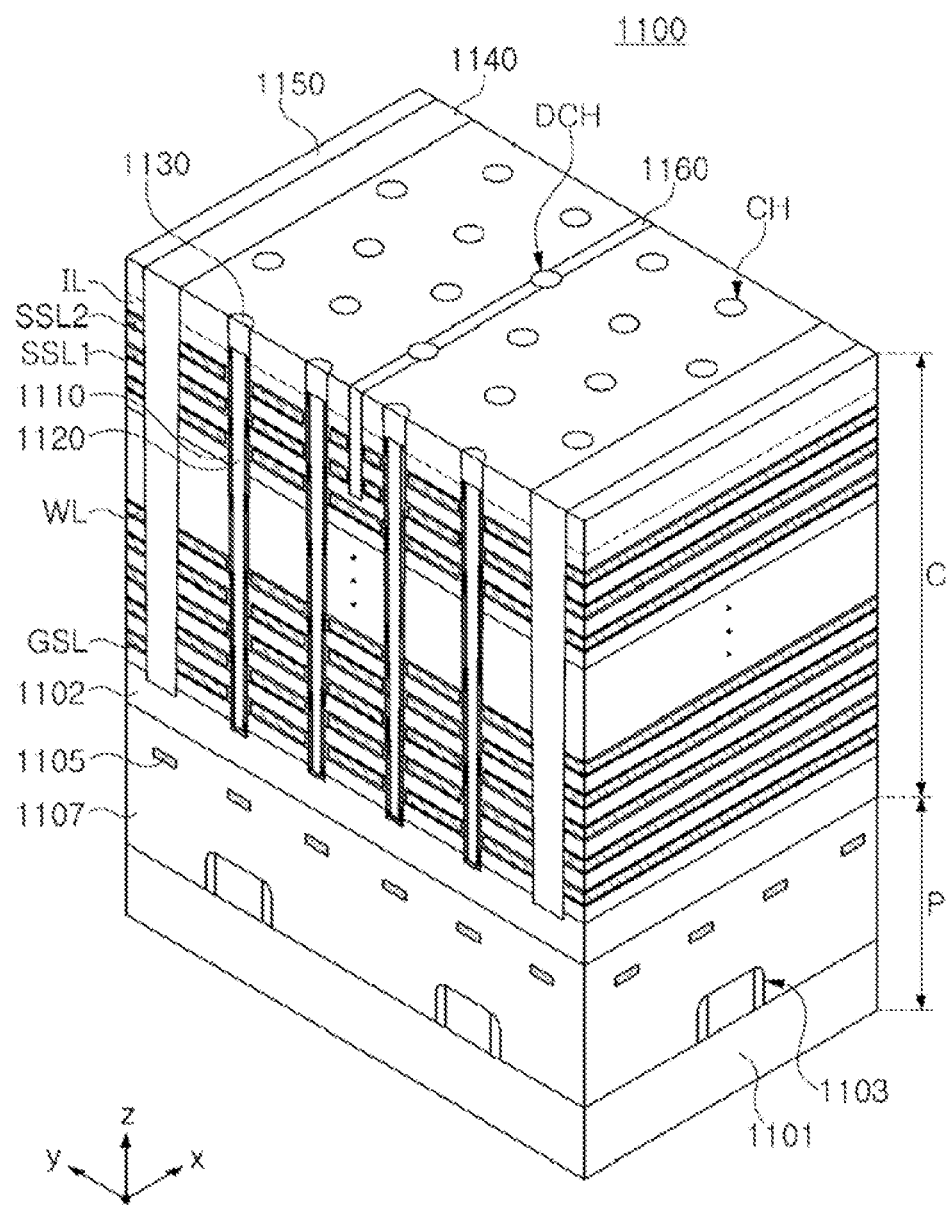

FIGS. 18 and 19 are views illustrating a memory device according to an embodiment of the present inventive concept.

First, referring to FIG. 18, a semiconductor device 1000 may include a first region 1010 and a second region 1020, stacked in a vertical direction (e.g., the Z-axis direction). The first region 1010 may be a peripheral circuit region, and may include a row decoder DEC, a page buffer PB, and a peripheral circuit PC, formed on a first substrate. For example, the peripheral circuit PC may include a voltage generator, a source driver, an input/output circuit, and the like.

The second region 1020 may be a cell region, and may include memory cell arrays MCA and first and second through-wiring regions TB1 and TB2, formed on a second substrate. Through-wirings connecting the first region 1010 and the second region 1020 and extending in a vertical direction may be disposed in each of the first and second through-wiring regions TB1 and TB2. Each of the memory cell arrays MCA may include cell blocks CBK arranged in the first direction (e.g., the Y-axis direction). In some embodiments, at least one dummy block may be disposed between at least a portion of the cell blocks CBK.

The first region 1010 may include a plurality of semiconductor elements for implementing the circuits, and wiring patterns connected to the semiconductor elements, and the semiconductor elements may be arranged in a plurality of voltage regions according to a power voltage required for an operation. For example, low voltage elements supplied with a first power voltage may be disposed in a low voltage region, and high voltage elements supplied with a second power voltage, higher than the first power voltage, may be disposed in a high voltage region. In some embodiments, middle voltage elements supplied with a third power voltage, higher than the first power voltage and lower than the second power voltage, may be disposed in a middle voltage region.

In the first region 1010, at least one dummy element may be disposed between at least a portion of the low voltage elements disposed in the low voltage region. The dummy element may be an element not included in standard cells and filler cells, stored in a standard library, and may have an active region having a relatively small area, compared to an element included in standard cells and filler cells.

FIG. 19 is a perspective view illustrating a memory device 1100 according to an embodiment of the present inventive concept. Referring to FIG. 19, a memory device 1100 according to an embodiment of the present inventive concept may include a cell region C and a peripheral circuit region P, arranged vertically. The cell region C may correspond to the first region 1010 described above with reference to FIG. 18, and the peripheral circuit region P may correspond to the second region 1020 described above with reference to FIG. 18. The peripheral circuit region P may include a first substrate 1101, and the cell region C may include a second substrate 1102, different from the first substrate 1101.

For example, the peripheral circuit region P may include a plurality of semiconductor elements 1103 provided on the first substrate 1101, a plurality of wiring patterns 1105 connected to the semiconductor elements 1103, a first interlayer insulating layer 1107 covering the semiconductor elements 1103 and the wiring patterns 1105, and the like. In the peripheral circuit region P, peripheral circuits necessary for driving the memory device 1100, for example, a page buffer, a row decoder, a voltage generator, an input/output circuit, and the like may be disposed. As described above, at least a portion of the semiconductor elements 1103, for example, semiconductor elements 1103 constituting an input/output circuit may be disposed in a low voltage region, and at least one dummy element having an area, smaller than an area of each of the semiconductor elements 1103, may be disposed between a pair of semiconductor elements 1103 adjacent to each other. As the cell region C and the peripheral circuit region P are stacked vertically, the semiconductor elements 1103 and at least one dummy element included in the peripheral circuit region P may be disposed between an upper surface of the first substrate 1101 and a lower surface of the second substrate 1102.

The second substrate 1102 included in the cell region C may be disposed on the first interlayer insulating layer 1107. The cell region C may include a ground select line GSL, word lines WL, string select lines SSL1 and SSL2, and a plurality of insulating layers IL, stacked on the second substrate 1102. The insulating layers IL may be alternately stacked with the ground select line GSL, the word lines WL, and the string select lines SSL1 and SSL2. The number of the ground select line GSL and the number of the string select lines SSL1 and SSL2 are not necessarily limited, as illustrated in FIG. 19, and may be variously changed.

In addition, the cell region C may include channel structures CH extending in a direction (e.g., the Z-axis direction), perpendicular to an upper surface of the second substrate 1102, and the channel structures CH may pass through the ground select line GSL, the word lines WL, and the string select lines SSL1 and SSL2, and may be connected to the second substrate 1102. The channel structures CH may include a channel region 1110, a buried insulating layer 1120 filling an inner space of the channel region 1110, a bit line connection layer 1130, and the like. Each of the channel structures CH may be connected to at least one bit line through the bit line connection layer 1130.

At least one gate insulating layer may be disposed outside the channel region 1110. In an embodiment, the gate insulating layer may include a tunneling layer, a charge storage layer, a blocking layer, and the like, sequentially arranged from the channel region 1110. According to an embodiment, at least one of the tunneling layer, the charge storage layer, and the blocking layer may have a shape surrounding the ground select line GSL, the word lines WL, and the string select lines SSL1 and SSL2.

The ground select line GSL, the word lines WL, and the string select lines SSL1 and SSL2 may be covered by an interlayer insulating layer 1150. Also, the ground select line GSL, the word lines WL, and the string select lines SSL1 and SSL2 may be separated into a plurality of memory blocks BLK1 and BLK2 by separation layers 1140. Each of the plurality of memory blocks BLK1 and BLK2 may be a unit region in which an erase operation is performed. In an embodiment, between a pair of separation layers 1140 adjacent to each other in the second direction (e.g., the Y-axis direction), the string select lines SSL1 and SSL2 may be separated into a plurality of regions by an upper separation layer 1160.

In an embodiment, dummy channel structures DCH may be provided in a region in which the upper separation layer 1160 is disposed. The dummy channel structures DCH may have the same structure as the channel structures CH, but might not be connected to a bit line.

Figure 20:
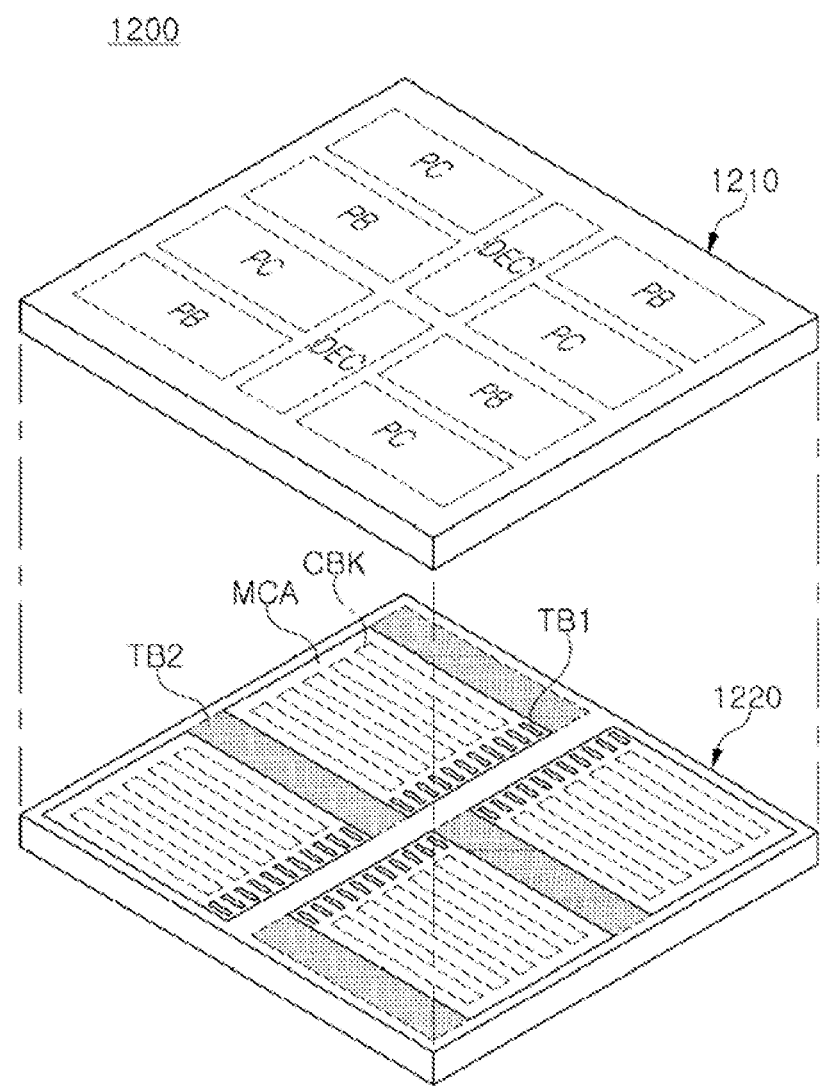
FIGS. 20 and 21 are views illustrating a memory device according to an embodiment of the present inventive concept.
Figure 21:
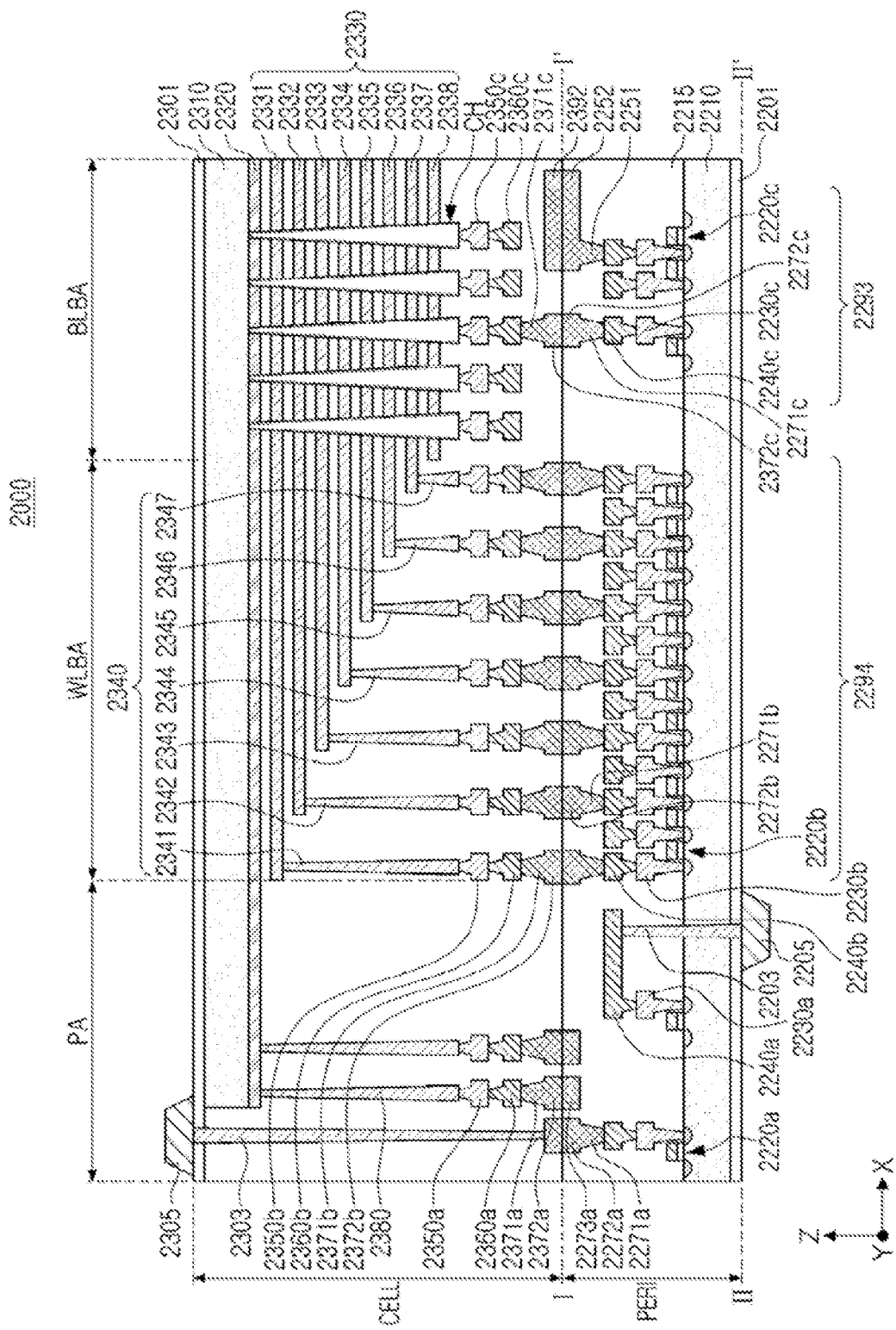

FIGS. 20 and 21 are views illustrating a memory device according to an embodiment of the present inventive concept.

First, referring to FIG. 20, a semiconductor element 1200 may include a first region 1210 and a second region 1220, stacked in a vertical direction (e.g., the Z-axis direction). The first region 1210 may be a peripheral circuit region, and the second region 1220 may be a cell region. Configurations of the first region 1210 and the second region 1220 may be similar to that described above with reference to FIG. 18.

Unlike the arrangement described above with reference to FIG. 18, in an arrangement illustrated in FIG. 20, the first region 1210 including the peripheral circuit region may be inverted and combined with the second region 1220. Therefore, semiconductor elements included in the first region 1210 and providing a row decoder DEC, a page buffer PB, and a peripheral circuit PC, gate electrode layers included in the second region 1220, bit lines, and the like may be arranged between the first substrate of the first region 1210 and the second substrate of the second region 1220. Structures of the first region 1210 and the second region 1220 will be described in more detail with reference to FIG. 21.

Similar to the arrangement described above with reference to FIG. 18, at least a portion of the semiconductor elements providing the row decoder DEC, the page buffer PB, and the peripheral circuit PC may be low voltage elements and may be disposed in a low voltage region, and may operate with a relatively small supply voltage. The low voltage elements may have a relatively small size, and thus a design rule thereof may also be different from those of other semiconductor elements. When a space that cannot be filled with standard cells and filler cells is formed in a process of arranging the low voltage elements, in an embodiment of the present inventive concept, a dummy element having an area, smaller than an area of each of the low voltage elements, may be disposed between the low voltage elements, to make characteristics more desirable and increase yield of the low voltage elements.

For example, the dummy element may include a dummy gate structure and a dummy active region. A length of the dummy active region on opposite sides of the dummy gate structure may be less than a length of the active region disposed on opposite sides of the gate structure in the low voltage element. In this case, the length may be defined in a direction intersecting extending directions of the gate structure and the dummy gate structure.

Referring to FIG. 21, a peripheral circuit region PERI and a cell region CELL of a memory device 2000 may include an external pad bonding area PA, a word line bonding area WLBA, and a bit line bonding area BLBA, respectively.

The peripheral circuit region PERI may include a first substrate 2210, an interlayer insulating layer 2215, a plurality of circuit elements 2220a, 2220b, and 2220c formed on the first substrate 2210, first metal layers 2230a, 2230b, and 2230c respectively connected to the plurality of circuit elements 2220a, 2220b, and 2220c, and second metal layers 2240a, 2240b, and 2240c respectively formed on the first metal layers 2230a, 2230b, and 2230c. In an embodiment, the first metal layers 2230a, 2230b, and 2230c may include tungsten having relatively high electrical resistivity, and the second metal layers 2240a, 2240b, and 2240c may include copper having relatively low electrical resistivity.

In the specification, although only the first metal layers 2230a, 2230b, and 2230c and the second metal layers 2240a, 2240b, and 2240c are illustrated and described, the embodiment is not necessarily limited thereto, and one or more additional metal layers may be further formed on the second metal layers 2240a, 2240b, and 2240c. At least a portion of the one or more additional metal layers formed on the second metal layers 2240a, 2240b, and 2240c may include aluminum or the like having a lower electrical resistivity than those of copper forming the second metal layers 2240a, 2240b, and 2240c.

The interlayer insulating layer 2215 may be disposed on the first substrate 2210 and may cover the plurality of circuit elements 2220a, 2220b, and 2220c, the first metal layers 2230a, 2230b, and 2230c, and the second metal layers 2240a, 2240b, and 2240c. The interlayer insulating layer 2215 may include an insulating material such as silicon oxide, silicon nitride, or the like.

Lower bonding metals 2271b and 2272b may be formed on the second metal layer 2240b in the word line bonding area WLBA. In the word line bonding area WLBA, the lower bonding metals 2271b and 2272b in the peripheral circuit region PERI may be electrically bonded to upper bonding metals 2371b and 2372b of the cell region CELL. The lower bonding metals 2271b and 2272b and the upper bonding metals 2371b and 2372b may include aluminum, copper, tungsten, or the like.

The cell region CELL may include at least one memory block. The cell region CELL may include a second substrate 2310 and a common source line 2320. On the second substrate 2310, a plurality of gate electrode layers 2331 to 2338 (i.e., 2330) may be stacked in a direction (e.g., the Z-axis direction), perpendicular to an upper surface of the second substrate 2310. At least one string select line and at least one ground select line may be arranged on and below the plurality of gate electrode layers 2330, respectively, and the plurality of gate electrode layers 2330 may be disposed between the at least one string select line and the at least one ground select line.

In the bit line bonding area BLBA, a channel structure CH may extend in a direction (e.g., the Z-axis direction), perpendicular to the upper surface of the second substrate 2310, and pass through the plurality of gate electrode layers 2330, the at least one string select line, and the at least one ground select line. The channel structure CH may include a data storage layer, a channel layer, a buried insulating layer, and the like, and the channel layer may be electrically connected to a first metal layer 2350c and a second metal layer 2360c. For example, the first metal layer 2350c may be a bit line contact, and the second metal layer 2360c may be a bit line. In an embodiment, the bit line 2360c may extend in the first direction (e.g., the Y-axis direction), parallel to the upper surface of the second substrate 2310.

In the arrangement illustrated in FIG. 21, an area in which the channel structure CH, the bit line 2360c, and the like are disposed may be defined as the bit line bonding area BLBA. In the bit line bonding area BLBA, the bit line 2360c may be electrically connected to the circuit elements 2220c providing a page buffer 2293 in the peripheral circuit region PERI. The bit line 2360c may be connected to upper bonding metals 2371c and 2372c in the cell region CELL, and the upper bonding metals 2371c and 2372c may be connected to lower bonding metals 2271c and 2272c connected to the circuit elements 2220c of the page buffer 2293.

In the word line bonding area WLBA, the gate electrode layers 2330 may extend in a second direction (e.g., an X-axis direction), parallel to the upper surface of the second substrate 2310 and perpendicular to the first direction, and may be connected to a plurality of cell contact plugs 2341 to 2347 (i.e., 2340). The plurality of gate electrode layers 2330 and the plurality of cell contact plugs 2340 may be connected to each other in pads provided by at least a portion of the plurality of gate electrode layers 2330 extending in different lengths in the second direction. A first metal layer 2350b and a second metal layer 2360b may be connected to an upper portion of the plurality of cell contact plugs 2340 connected to the plurality of gate electrode layers 2330, sequentially. The plurality of cell contact plugs 2340 may be connected to the peripheral circuit region PERI by the upper bonding metals 2371b and 2372b of the cell region CELL and the lower bonding metals 2271b and 2272b of the peripheral circuit region PERI in the word line bonding area WLBA.

The plurality of cell contact plugs 2340 may be electrically connected to the circuit elements 2220b forming a row decoder 2294 in the peripheral circuit region PERI. In an embodiment, operating voltages of the circuit elements 2220b of the row decoder 2294 may be different than operating voltages of the circuit elements 2220c forming the page buffer 2293. For example, operating voltages of the circuit elements 2220c forming the page buffer 2293 may be greater than operating voltages of the circuit elements 2220b forming the row decoder 2294.

A common source line contact plug 2380 may be disposed in the external pad bonding area PA. The common source line contact plug 2380 may include a conductive material such as a metal, a metal compound, polysilicon, or the like, and may be electrically connected to the common source line 2320. A first metal layer 2350a and a second metal layer 2360a may be stacked on an upper portion of the common source line contact plug 2380, sequentially. For example, an area in which the common source line contact plug 2380, the first metal layer 2350a, and the second metal layer 2360a are disposed may be defined as the external pad bonding area PA.

Input/output pads 2205 and 2305 may be disposed in the external pad bonding area PA. Referring to FIG. 21, a lower insulating film 2201 covering a lower surface of the first substrate 2210 may be formed below the first substrate 2210, and a first input/output pad 2205 may be formed on the lower insulating film 2201. The first input/output pad 2205 may be connected to at least one of the plurality of circuit elements 2220a, 2220b, and 2220c disposed in the peripheral circuit region PERI through a first input/output contact plug 2203, and may be separated from the first substrate 2210 by the lower insulating film 2201. In addition, a side insulating film may be disposed between the first input/output contact plug 2203 and the first substrate 2210 to electrically separate the first input/output contact plug 2203 and the first substrate 2210.

Referring to FIG. 21, an upper insulating film 2301 covering the upper surface of the second substrate 2310 may be formed on the second substrate 2310, and a second input/output pad 2305 may be disposed on the upper insulating film 2301. The second input/output pad 2305 may be connected to at least one of the plurality of circuit elements 2220a, 2220b, and 2220c disposed in the peripheral circuit region PERI through a second input/output contact plug 2303.

According to embodiments, the second substrate 2310, the common source line 2320, and the like might not be disposed in an area in which the second input/output contact plug 2303 is disposed. Also, the second input/output pad 2305 might not overlap the gate electrode layers 2330 in the third direction (e.g., the Z-axis direction). Referring to FIG. 21, the second input/output contact plug 303 may be separated from the second substrate 2310 in a direction, parallel to the upper surface of the second substrate 2310, and may pass through the interlayer insulating layer 2315 of the cell region CELL to be connected to the second input/output pad 2305.

According to embodiments, the first input/output pad 2205 and the second input/output pad 2305 may be selectively formed. For example, the memory device 2000 might include only the first input/output pad 2205 disposed on the first substrate 2210 or the second input/output pad 2305 disposed on the second substrate 2310. Alternatively, the memory device 2000 may include both the first input/output pad 2205 and the second input/output pad 2305.

For example, circuit elements 2220a connected to the first input/output pad 2205 and the second input/output pad 2305 may provide an input/output circuit, and may operate with a relatively small power voltage, compared to circuit elements 2220c providing the page buffer 2293. For example, the circuit elements 2220a providing the input/output circuit may be low voltage elements, and a dummy element having a dummy active region and a dummy gate structure may be disposed between at least a portion of the circuit elements 2220a. The dummy active region may have a smaller area, compared to an active region included in each of the circuit elements 2220a.

In the memory device 2000 as illustrated in FIG. 21, the gate electrode layers 2330 included in the cell region CELL as well as the circuit elements 2220a, 2220b, and 2220c and the dummy element included in the peripheral circuit region PERI may be disposed between the first substrate 2210 and the second substrate 2310. Alternatively, due to arrangement of the cell region CELL and the peripheral circuit region PERI. In each of the external pad bonding area PA and the bit line bonding area BLBA included in the cell region CELL and the peripheral circuit region PERI, a metal pattern of an uppermost metal layer may exist as a dummy pattern. Alternatively, the uppermost metal layer may be empty.

In the external pad bonding area PA, the memory device 2000 may include a lower metal pattern 2273a, corresponding to an upper metal pattern 2372a formed in an uppermost metal layer of the cell region CELL, and having the same cross-sectional shape as the upper metal pattern 2372a of the cell region CELL so as to be connected to each other, in an uppermost metal layer of the peripheral circuit region PERI. In the peripheral circuit region PERI, the lower metal pattern 2273a formed in the uppermost metal layer of the peripheral circuit region PERI might not be connected to a contact. Similarly, in the external pad bonding area PA, an upper metal pattern, corresponding to the lower metal pattern formed in an uppermost metal layer of the peripheral circuit region PERI, and having the same shape as the lower metal pattern of the peripheral circuit region PERI, may be formed in an upper metal layer of the cell region CELL.

The lower bonding metals 2271b and 2272b may be formed on the second metal layer 2240b in the word line bonding area WLBA. In the word line bonding area WLBA, the lower bonding metals 2271b and 2272b of the peripheral circuit region PERI may be electrically connected to the upper bonding metals 2371b and 2372b of the cell region CELL by a bonding.

Further, in the bit line bonding area BLBA, an upper metal pattern 2392, corresponding to a lower metal pattern 2252 formed in the uppermost metal layer of the peripheral circuit region PERI, and having the same cross-sectional shape as the lower metal pattern 2252 of the peripheral circuit region PERI, may be formed in an uppermost metal layer of the cell region CELL. A contact might not be formed on the upper metal pattern 2392 formed in the uppermost metal layer of the cell region CELL.

According to an embodiment of the present inventive concept, a dummy element having a dummy active region and a dummy gate structure may be disposed between adjacent semiconductor elements, and a length of the dummy active region may be less than a length of an active region of each of the semiconductor elements in an adjacent direction of the semiconductor elements. Therefore, a semiconductor device easily and efficiently satisfying a design rule may be provided, characteristics of semiconductor elements may be made more desirable, and an interval between gate structures may be reduced, thereby increasing yield.

Various effects of the present inventive concept are not necessarily limited to the above, and will be more easily understood in the process of describing specific embodiments of the present inventive concept.

While embodiments have been illustrated and described above, it will be apparent to those skilled in the art that modifications and variations could be made without departing from the scope of the present inventive concept.

What is claimed is:

1. A semiconductor device, comprising:
a plurality of semiconductor elements, each of the plurality of semiconductor elements including an active region disposed on a substrate, and a gate structure intersecting the active region, wherein a longest dimension of the gate structure extends in a first direction that is parallel to an upper surface of the substrate; and
at least one dummy element disposed between a pair of semiconductor elements, of the plurality of semiconductor elements, in a second direction, intersecting the first direction,
wherein the at least one dummy element includes a dummy active region and at least one dummy gate structure intersecting the dummy active region and wherein a longest dimension of the dummy gate structure extends in the first direction,
wherein the active region includes a first active region and a second active region, and the gate structure is disposed between the first active region and the second active region in the second direction,
wherein the dummy active region includes a first dummy active region and a second dummy active region, and the dummy gate structure is disposed between the first dummy active region and the second dummy active region,
wherein a length of each of the first dummy active region and the second dummy active region, in the second direction, is less than a length of each of the first active region and the second active region included in each of the pair of semiconductor elements,
wherein the second direction is a horizontal direction parallel to the upper surface of the substrate, and
wherein an entire length of the dummy active region, in the first direction, is greater than or equal to an entire length of the active region included in at least one of the pair of semiconductor elements.

2. The semiconductor device of claim 1, wherein a length of the dummy active region, in the first direction, is equal to a length of the active region included in at least one of the pair of semiconductor elements.

3. The semiconductor device of claim 2, wherein at least one boundary, among boundaries of the active region included in the pair of semiconductor elements, is disposed in the same position, in the first direction, as at least one boundary, among boundaries of the dummy active region.

4. The semiconductor device of claim 1, wherein a length of the dummy active region, in the first direction, is different from a length of the active region included in each of the pair of semiconductor elements.

5. The semiconductor device of claim 4, wherein the length of the dummy active region, in the first direction, is longer than the length of the active region included in each of the pair of semiconductor elements.

6. The semiconductor device of claim 1, wherein, in each of the pair of semiconductor elements, the first active region provides a source region and the second active region provides a drain region disposed on opposite sides of the gate structure,
wherein in the at least one dummy element, the first dummy active region provides a dummy source region and the second dummy active region provides a dummy drain region disposed on opposite sides of the at least one dummy gate structure, and
wherein an area of each of the source region and the drain region is larger than an area of each of the dummy source region and the dummy drain region, respectively.

7. The semiconductor device of claim 6, wherein at least one of the source region or the drain region is connected to at least one wiring pattern among wiring patterns disposed on the plurality of semiconductor elements in a third direction, perpendicular to the upper surface of the substrate, by an active contact, and
wherein the dummy source region and the dummy drain region are electrically separated from the wiring patterns.

8. The semiconductor device of claim 7, wherein at least one of the source region or the drain region is connected to the at least one wiring pattern by two or more active contacts.

9. The semiconductor device of claim 7, wherein dimensions of the active contact in the first and second directions are different from each other.

10. The semiconductor device of claim 9, wherein a dimension of the active contact in the first direction is greater than a dimension of the active contact in the second direction.

11. The semiconductor device of claim 1, wherein the plurality of semiconductor elements comprise low voltage elements disposed in a low voltage region to which a first power voltage is supplied, and high voltage elements disposed in a high voltage region to which a second power voltage, greater than the first power voltage, is supplied, and
wherein the pair of semiconductor elements are the low voltage elements.

12. The semiconductor device of claim 11, wherein the at least one dummy element is disposed exclusively in the low voltage region.

13. The semiconductor device of claim 1, wherein the at least one dummy gate structure comprises a pair of dummy gate structures separated from each other in the second direction.

* * * * *